US012608852B1

(12) United States Patent
Chen et al.

(10) Patent No.: US 12,608,852 B1
(45) Date of Patent: Apr. 21, 2026

(54) UTILIZING A MULTIMODAL LARGE LANGUAGE MODEL TO GENERATE SYNTHESIZED RESPONSES CORRESPONDING TO MULTIMODAL CONTENT ITEMS

(71) Applicant: Dropbox, Inc., San Francisco, CA (US)

(72) Inventors: Dongjie Chen, Pasadena, CA (US); Dhruvil Gala, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/973,860

(22) Filed: Dec. 9, 2024

Related U.S. Application Data

(60) Provisional application No. 63/710,513, filed on Oct. 22, 2024.

(51) Int. Cl.
*G06T 5/60* (2024.01)
*G06T 5/00* (2024.01)
*G06T 11/00* (2006.01)

(52) U.S. Cl.
CPC .................................... *G06T 11/00* (2013.01)

(58) Field of Classification Search
CPC .................................... G06T 5/60; G06T 5/00
See application file for complete search history.

(56) References Cited

U.S. PATENT DOCUMENTS

| | | | |
|---|---|---|---|
| 4,778,133 A | 10/1988 | Sakurai | |
| 7,009,475 B2 | 3/2006 | Niimi et al. | |
| 7,522,967 B2 | 4/2009 | Zhang et al. | |
| 7,657,652 B1 | 2/2010 | Balaji | |
| 8,401,255 B2 | 3/2013 | Sabol et al. | |
| 9,372,926 B2 | 6/2016 | Olstad et al. | |
| 10,289,701 B2 | 5/2019 | Mitchell | |
| 2016/0259494 A1* | 9/2016 | McMichael | H04L 67/535 |
| 2018/0005666 A1* | 1/2018 | Yang | G11B 27/326 |
| 2021/0014575 A1* | 1/2021 | Selfors | G09B 19/06 |
| 2022/0121702 A1* | 4/2022 | Kale | G06N 3/04 |
| 2022/0309279 A1* | 9/2022 | Biswas | G06V 20/49 |
| 2023/0360058 A1* | 11/2023 | Lundell | G06Q 10/0633 |
| 2024/0104309 A1* | 3/2024 | Hsu | G06N 3/09 |
| 2024/0147025 A1* | 5/2024 | Graciarena | H04N 21/814 |

(Continued)

FOREIGN PATENT DOCUMENTS

| | | |
|---|---|---|
| EP | 1394692 A1 | 3/2004 |
| EP | 3056298 A1 | 8/2016 |
| EP | 2227804 B1 | 10/2017 |

*Primary Examiner* — Yi Yang
(74) *Attorney, Agent, or Firm* — Keller Preece PLLC

(57) ABSTRACT

The present disclosure relates to systems, non-transitory computer-readable media, and methods for processing multimodal content to generate summaries or responses using a multimodal large language model. In one or more embodiments, the disclosed systems the disclosed systems utilize the multimodal large language model to generate various types of synthesized responses corresponding to multimodal content items that contain data and information within images. For example, in some embodiments, in response to receiving a request to generate a synthesized response corresponding to a multimodal content item, the disclosed systems employ preprocessing pipelines that generate thumbnail images from the multimodal content item and use the thumbnail images to generate a data structure for a prompt for the multimodal large language model.

20 Claims, 13 Drawing Sheets

(56) References Cited

U.S. PATENT DOCUMENTS

| | | | | |
|---|---|---|---|---|
| 2024/0201959 | A1 * | 6/2024 | Callegari | G06F 8/35 |
| 2024/0273371 | A1 * | 8/2024 | Chen | G06N 3/082 |
| 2024/0311579 | A1 * | 9/2024 | Dong | G06F 40/284 |
| 2024/0320310 | A1 * | 9/2024 | Callegari | G06F 21/31 |

* cited by examiner

900

Receiving A Request To Generate A Synthesized Response Corresponding To A Multimodal Content Item *902*

Generating One Or More Thumbnail Images From The Multimodal Content Item *904*

Generating A Prompt Data Structure Based On The One Or More Thumbnail Images *906*

Generating The Synthesized Response By Providing The Prompt Data Structure Within A Prompt To A Multimodal Large Language Model *908*

Providing The Synthesized Response For Display On The Client Device *910*

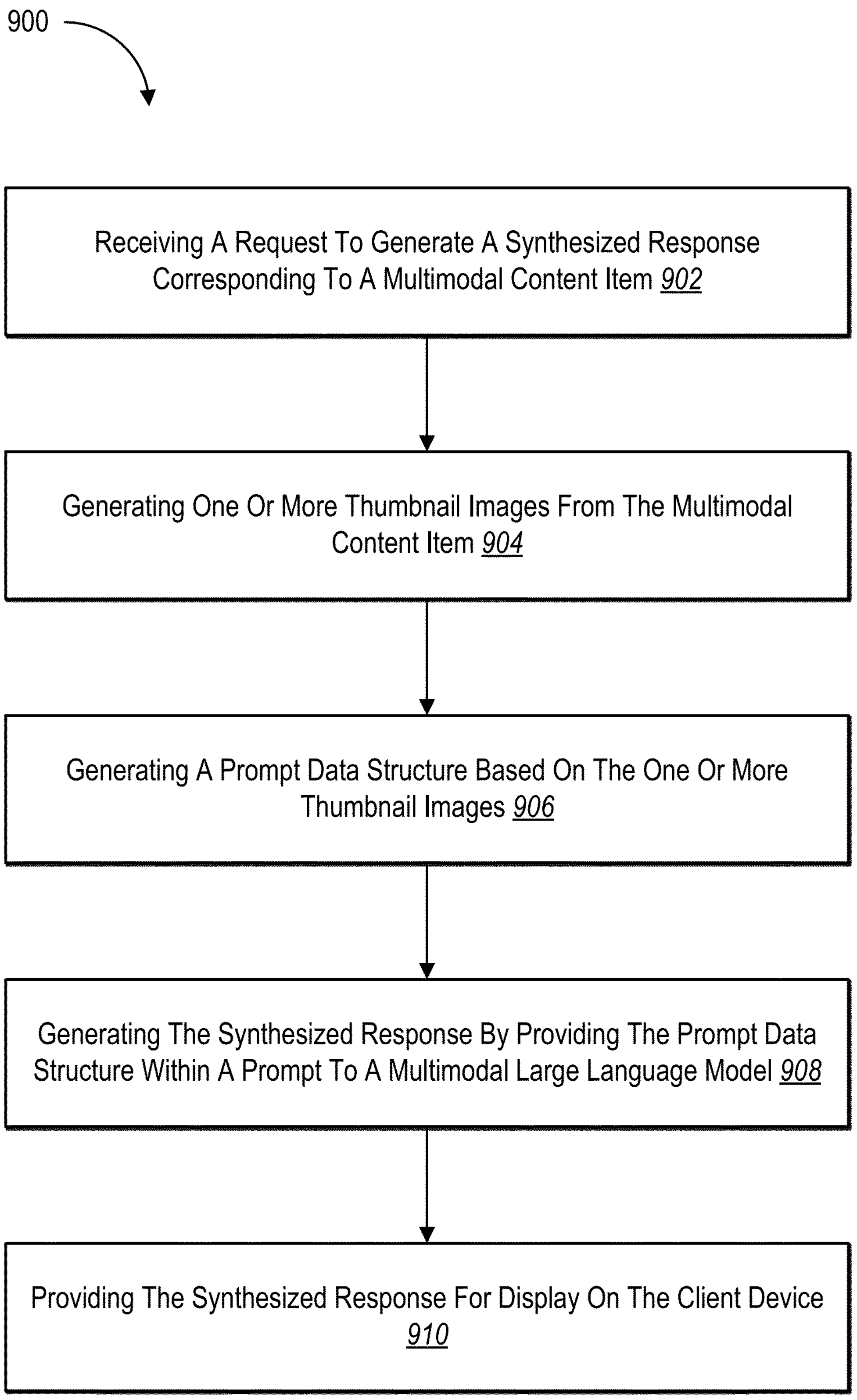

*Fig. 9*

UTILIZING A MULTIMODAL LARGE LANGUAGE MODEL TO GENERATE SYNTHESIZED RESPONSES CORRESPONDING TO MULTIMODAL CONTENT ITEMS

CROSS-REFERENCE TO RELATED APPLICATIONS

This application claims priority to and the benefit of U.S. Provisional Patent Application No. 63/710,513, filed on Oct. 22, 2024, which is incorporated herein by reference in its entirety.

BACKGROUND

In recent years, significant developments in machine learning capabilities have been seen across many fields, including data processing and query response from natural language. For example, recent advancements in large language models have led to systems that can receive textual prompts and generate natural language responses that respond to the prompt based on an immense amount of general training data. To illustrate, some existing systems can utilize natural language prompts comprising a text input to perform a variety of text-based tasks, such as language translation, text classification, and content description generation. However, while large language models can perform a variety of tasks, a number of technical deficiencies exist with regard to using large language models to process content items that rely on images to convey information.

For example, conventional systems are inaccurate as they fail to account for information conveyed through images within content items. For example, content items such as documents, PDF files, and slides often convey information within images, including within text of the image, placement (or context) of the image within the content item, and/or the correlation of images with other content (e.g., text, other images) of the content item. However, large language models are unable to process images within content items-often failing to process image-heavy content items at all. At best, even if large language models generate output corresponding to image-heavy content items, since the output doesn't include the image content, the output provides inaccurate responses to user input (e.g., questions) or summaries corresponding to the image-heavy content item. Some conventional systems attempt to access image content by using optical character recognition to utilize text within images of an image-heavy content item and providing the text to large language models to generate responses for the content item. Optical character recognition, however, only accounts for text within an image, and fails to account for relationships of images with other content, text, and information within the images, thus also resulting in inaccurate responses and summaries corresponding to content items.

In addition, due in part to their inaccuracies, conventional systems are inflexible. For example, because large language models fail to process image-heavy content items, conventional systems that utilize these large language models are limited in content items that they can process. For example, conventional systems can generate intelligent responses and/or summaries for text-based content items but are unable to provide output for image-heavy content items. Further, while conventional systems can access content items on third-party systems and display them within interfaces along with local and cloud content items, conventional systems are unable to generate summaries and/or responses for image-heavy content items on third-party systems.

Moreover, conventional systems are inefficient. For example, large content items, with multiple pages of text and other content to analyze, require large language models to parse and generate responses for a significant amount of content, which leads to decreased latency, including slow response times and noticeable delays. Further, large content files consume significant memory as large language models must store more context while generating output. As a result, when processing large content files, large language models quickly hit the memory limits of large language models, particularly if a large language model needs to generate context-rich responses. Indeed, when generating content for large content items, these inefficiencies not only lead to slow response times but can also lead to large language models failing to generate a response altogether. These, along with additional problems and issues, exist with regard to conventional systems that utilize large language models.

SUMMARY

Embodiments of the present disclosure provide benefits and/or solve one or more of the foregoing or other problems in the art with systems, non-transitory computer-readable media, and methods for utilizing a multimodal large language model to generate responses for multimodal content items. Specifically, in one or more embodiments, the disclosed systems utilize the multimodal large language model to generate various types of synthesized responses corresponding to multimodal content items that contain data and information within images. For example, in some embodiments, in response to receiving a request to generate a synthesized response corresponding to a multimodal content item, the disclosed systems employ preprocessing pipelines that generate multimodal representations from the multimodal content item and use the multimodal representations to generate a data structure for a prompt for the multimodal large language model. In some embodiments, where the request to generate a synthesized response includes a request to generate a response to a user input, the disclosed systems generate embeddings from the multimodal representations and use the embeddings to select a set of thumbnails for the prompt and from which to generate the synthesized response. In other embodiments, where the request to generate the synthesized response includes a request to generate a summary corresponding to the multimodal content item, the disclosed systems utilize the multimodal large language model to generate summaries from the multimodal representations and provide the summaries to an additional large language model to generate a synthesized summary. Additional features and advantages of one or more embodiments of the present disclosure are outlined in the description that follows and, in part, will be obvious from the description or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 9 illustrates a flowchart of a series of acts for utilizing a multimodal large language model to generate synthesized responses corresponding to multimodal content items in accordance with one or more embodiments.

DETAILED DESCRIPTION

This disclosure describes one or more embodiments of a multimodal content response generation system that utilizes a multimodal large language model to generate synthesized responses (e.g., summaries or answers to user input) corresponding to multimodal content items. Specifically, the multimodal content response generation system employs preprocessing pipelines that utilize the multimodal large language model to process multimodal content items containing data and information within images. For example, a preprocessing pipeline for generating a synthesized response to user input includes the multimodal content response generation system generating multimodal representations for a prompt data structure to include in a prompt for the multimodal language model to generate a synthesized response. As another example, a summary preprocessing pipeline for generating a synthesized summary of the multimodal content item can include the multimodal content response generation system 100 utilizing the multimodal large language model to process the multimodal representations (or sets of multimodal representations) and generate multimodal summaries of the multimodal representations. The multimodal content response generation system can then provide the multimodal summaries to an additional large language model to generate a synthesized summary.

Figure 1:
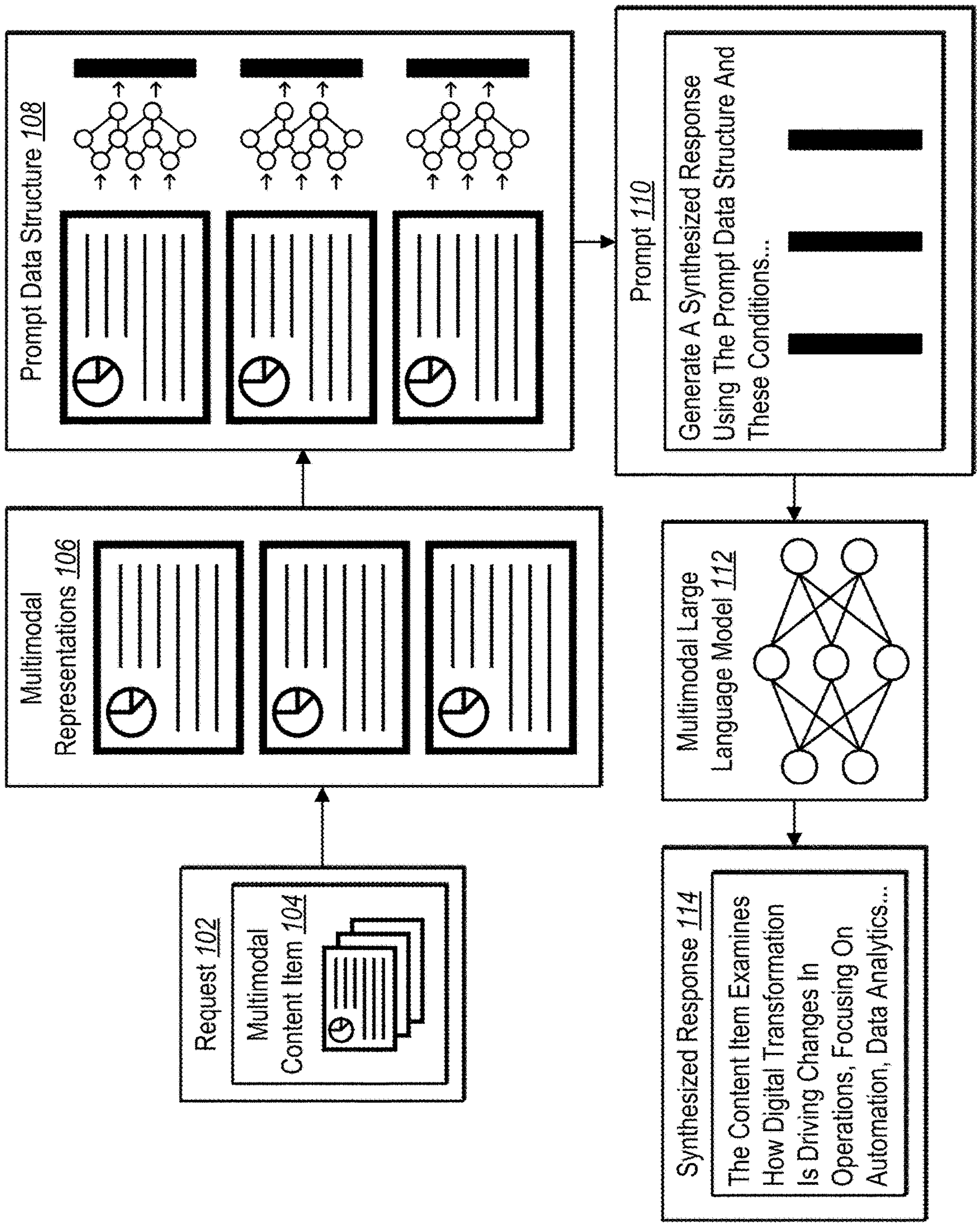
FIG. 1 illustrates an example diagram of an overview of a multimodal content response generation system in accordance with one or more embodiments.

FIG. 1 illustrates an example overview of the multimodal content response generation system 100 utilizing a multimodal large language model to generate a synthesized response corresponding to a multimodal content item. As shown, the multimodal content response generation system 100 receives a request 102 to generate a synthesized response for multimodal content item 104. In some instances, request 102 is a request to generate a synthesized response to a user input corresponding to multimodal content item 104. In other instances, request 102 is a request to generate a synthesized summary for multimodal content item 104.

The multimodal content response generation system 100 can receive request 102 based on various user inputs associated with the multimodal content item 104. For example, the multimodal content response generation system 100 can receive a user selection of an option to generate a synthesized summary for multimodal content item 104. As another example, the multimodal content response generation system 100 receives text input from within a content management interface (or an intelligent assistance interface associated with the content management system) to generate a synthesized response corresponding to multimodal content item 104 (e.g., an answer to a question in the text input). Additional details regarding the multimodal content response generation system 100 receiving a request to generate a synthesized response from a content management interface are provided with respect to FIGS. 6A-6C below.

In one or more embodiments, the multimodal content response generation system 100 receives request 102 from within an intelligent assistance interface. For example, an intelligent assistance interface can identify content items within a content management system and perform actions corresponding to content items, such as receiving user interactions for performing particular tasks or actions, answering questions about content items, and displaying content items corresponding to the tasks or questions. In some embodiments, the intelligent assistance interface is an intelligent assistance interface as described in U.S. application Ser. No. 18/342,469, entitled GENERATING AND PROVIDING MORPHING ASSISTANT INTERFACES THAT TRANSFORM ACCORDING TO ARTIFICIAL INTELLIGENCE SIGNALS, which is hereby incorporated by reference in its entirety.

As further illustrated, the multimodal content response generation system 100 generates multimodal representations 106 as digital representations of a content item. In particular, based on request 102, the multimodal content response generation system 100 generates multimodal representations 106 that represent the content of multimodal content item 104. For example, a multimodal representation of multimodal representations 106 can be a thumbnail image that represents a page of a PDF, a slide of a slide deck, a page from a document, or another selection of the multimodal content item 104. Additional details regarding the multimodal content response generation system 100 generating multimodal representations (or thumbnail images) from a multimodal content item are provided below with respect to FIG. 2.

As also shown, the multimodal content response generation system 100 generates prompt data structure 108 to provide in prompt 110. In particular, the multimodal content response generation system 100 generates prompt data structure 108 by selecting multimodal representations (or sets of multimodal representations) from multimodal representations 106 as a data set to include in prompt 110. For example, prompt 110 can include prompt data structure 108 and instructions to use multimodal representations from prompt data structure 108 to multimodal large language model 112 to generate a synthesized response 114.

The multimodal content response generation system 100 can generate prompt data structure 108 based on a preprocessing pipeline associated with request 102. For example, if request 102 includes a request for a synthesized response to user input (e.g., a question), the multimodal content response generation system 100 generates prompt data structure 108 that corresponds to an answer preprocessing pipeline. If request 102 includes a request for a synthesized summary of a multimodal content item, the multimodal content response generation system 100 generates prompt data structure 108 that corresponds to a summary preprocessing pipeline.

In some embodiments, when the multimodal content response generation system 100 utilizes an answer preprocessing pipeline to generate a synthesized response to a user input, the multimodal content response generation system 100 generates prompt data structure 108 by using embeddings to select multimodal representations from multimodal representations 106. Specifically, the multimodal content response generation system 100 generates text embeddings and image embeddings for multimodal representations 106 and selects multimodal representations from multimodal representations 106 based on embedding distances between the text embeddings and the user input. For example, the multimodal content response generation system 100 ranks multimodal representations 106 according to the embedding distances and selects a set of multimodal representations from multimodal representations 106 for prompt data structure 108. Additional details regarding the multimodal content response generation system 100 generating a prompt data structure for an answer preprocessing pipeline are provided with respect to FIG. 3 below.

Further, in one or more embodiments where the multimodal content response generation system 100 utilizes a summary preprocessing pipeline, the multimodal content response generation system 100 generates prompt data structure 108 by selecting sliding windows of multimodal representations 106. Specifically, the multimodal content response generation system 100 selects sliding windows by selecting a set of k multimodal representations, then selecting additional sets of thumbnail images moving down m units. For example, the multimodal content response generation system 100 selects a first sliding window by selecting a first set of k multimodal representations (e.g., multimodal representations 1-2 or 1-5) and then selecting a second sliding window by selecting k multimodal representations but offset m multimodal representations (e.g., one multimodal representation) from the first set of multimodal representations (e.g., multimodal representations 2-3 or 2-6). The multimodal content response generation system 100 continues selecting sliding windows until all multimodal representations of multimodal representations 106 are selected for prompt data structure 108.

The summary preprocessing pipeline also includes the multimodal content response generation system 100 providing prompt data structure 108 within prompt 110 to multimodal large language model 112 to generate multimodal summaries of the sliding windows. The multimodal content response generation system 100 can provide the multimodal summaries to an additional large language model to generate a synthesized summary for multimodal content item 104. Additional details of the multimodal content response generation system 100 generating a prompt data structure for a summary preprocessing pipeline are provided with respect to FIG. 4 below.

In one or more embodiments, prior to generating multimodal representations 106, the multimodal content response generation system 100 determines a content item type for a content item. Specifically, in response to receiving request 102 to generate a synthesized response for a content item, the multimodal content response generation system 100 determines whether the content item is a multimodal content item (e.g., the content item is made up of an amount of image content) or whether the content item is a text-based content item. If the content item is a multimodal content item, the multimodal content response generation system 100 can utilize the answer preprocessing pipeline to generate a synthesized response or the summary preprocessing pipeline to generate a synthesized summary. Additional details regarding the multimodal content response generation system 100 determining whether a content item is a multimodal content item are provided below with respect to FIG. 5.

In addition, in one or more embodiments, the multimodal content response generation system 100 sends the synthesized response to the client device associated with request 102. For example, the multimodal content response generation system 100 sends the synthesized response to the client device for display within a summary and response interface on the client device. Additional details regarding the multimodal content response generation system 100 providing a display of a synthesized response within a summary and response interface are provided with respect to FIG. 7 below.

The multimodal content response generation system 100 provides a number of technical advantages relative to conventional systems. For example, the multimodal content response generation system 100 improves accuracy relative to conventional systems that utilize large language models. For example, unlike conventional systems that are unable to process image-heavy content items and fail to generate output or generate inaccurate output, the multimodal content response generation system 100 employs preprocessing pipelines that generate accurate output for multimodal content items. Specifically, the multimodal content response generation system 100 generates multimodal representations of a multimodal content item and generates prompt data structures by selecting multimodal representations for a multimodal large language model to generate accurate output for the multimodal content item. Indeed, unlike conventional systems that fail to account for image content, the multimodal content response generation system 100 can analyze and generate output for multimodal content items that accounts for information conveyed through placement and/or spacing of images and text content within an image.

In addition, not only does the multimodal content response generation system 100 improve accuracy over conventional systems that use a large language model, but the multimodal content response generation system 100 also generates more accurate content by using preprocessing pipelines that generate prompt data structures for multimodal representations. Specifically, the multimodal content response generation system 100 uses preprocessing pipelines that intelligently select multimodal representations for prompt data structures for the multimodal large language model. For example, an answer preprocessing pipeline utilizes an embedding-generating machine-learning model that generates image embeddings for the multimodal representations and text embedding corresponding to user input, then generates embedding distances between the text embeddings and the user input. Based on the embedding distances, the multimodal content response generation system 100 selects a set of multimodal representations to include in a prompt data structure that includes portions of the multimodal content item that will generate an accurate synthesized response based on the user input. As another example, a summary preprocessing pipeline selects sliding windows of multimodal representations for the multimodal large language model to generate multimodal summaries, then utilizing an additional large language model to generate a synthesized summary. Indeed, by generating prompt data structures corresponding to the preprocessing pipelines, the multimodal large language model can accurately extract the information from a multimodal content item for generating a synthesized summary or a synthesized response.

In addition, the multimodal content response generation system 100 improves flexibility relative to conventional systems. As mentioned, unlike conventional systems that are unable to process image-heavy content items, the multimodal content response generation system 100 can generate synthesized responses for multimodal content items. The multimodal content response generation system 100 also uses preprocessing pipelines for generating synthesized responses (or synthesized summaries) for content items based on if a content item is a multimodal content item and whether the request corresponds to the synthesized response or a synthesized summary. Further, the multimodal content response generation system 100 utilizes a communication proxy and APIs to access the internal content of third-party stored content items connected to a content management system and/or an intelligent assistance interface and generates synthesized responses and synthesized summaries for the third-party stored content items. Indeed, the multimodal content response generation system 100 provides a selectable option to generate synthesized responses and synthesized summaries for content items, regardless of whether the content item is a multimodal content item or a text-based content item and whether it is a locally stored content item, a server-stored (or cloud-stored) content item, or a third-party stored content item.

Moreover, the multimodal content response generation system 100 improves efficiency relative to conventional systems. Unlike conventional systems that have slow response times and noticeable delays when processing large content items, the multimodal content response generation system 100 utilizes preprocessing pipelines that improve latency relative to conventional systems. For example, the multimodal content response generation system 100 generates prompt data structures that intelligently select multimodal representations for prompt data structures for a multimodal large language model. An answer preprocessing pipeline generates a prompt data structure by using embedding distances to select multimodal representations representing content corresponding to the user input. By selecting the images corresponding to the user input, the multimodal content response generation system 100 is able to generate an accurate synthesized response while utilizing far less memory and improving latency relative to conventional systems. Further, a summary preprocessing pipeline selects sliding windows and utilizes the multimodal large language model to generate textual multimodal summaries, then utilizes an additional large language model to generate a synthesized summary of the multimodal content item. By generating textual multimodal summaries of sliding windows, then generating a synthesized summary from the textual multimodal summaries, rather than generating a summary of the entire multimodal content item, the multimodal content response generation system 100 improves latency over conventional systems.

As illustrated by the foregoing discussion, the present disclosure utilizes a variety of terms to describe features and advantages of the multimodal content response generation system 100. Additional details regarding the meaning of such terms are now provided. For example, as used herein, the term "content item" or "digital item" refers to a digital object or a digital file that includes information interpretable by a computing device (e.g., a client device) to present information to a user. A content item can include a file such as a digital text file, a digital image file, a digital audio file, a webpage, a website, a digital video file, a web file, a link, a digital document file, or some other type of file or digital object. A content item can have a particular file type or file format, which may differ for different types of digital content items (e.g., digital documents. digital images, digital videos, or digital audio files). In some cases, a content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A content item can be editable or otherwise modifiable and can also be sharable from one user account (or client device) to another. In some cases, a content item is modifiable by multiple user accounts (or client devices) simultaneously and/or at different times.

Also, as used herein, the term "internal content" refers to the information, data, and media elements contained within a content item. Specifically, the term "internal content" refers to the portion of the content item that conveys information or data from within the content item and is not used exclusively for rendering the information. For example, internal content refers to the images, text, tables, charts, and any embedded media or hyperlinks that contribute to the document's purpose and message.

In addition, as used herein, the term "multimodal content item" refers to a content item where at least a portion of the digital content within the content item is image content. In particular, the term "multimodal content item" refers to a content item where at least a portion of the internal content includes image content that conveys information for the content item rather than (or in addition to) text or other content. For example, a multimodal content item refers to the amount of image data within the content item (e.g., not based solely on the file type of the content item), that may or may not be present with text or other data. To illustrate, a multimodal content item can be a document or PDF that contains a threshold amount of image data and where the image data conveys at least some of the meaning in the document or PDF.

Moreover, as used herein, the term "multimodal content classification" refers to a categorization of a content item indicating the internal content item. Specifically, the term "multimodal content classification" includes a classification that indicates that a portion of the internal content of the content item is conveyed using images. For example, "multimodal content classification" is assigned to a content item when a threshold amount (or percentage) of the internal content is image data.

Further, as used herein, the term "synthesized response" refers to an output of a large language model. Specifically, the term "synthesized response" refers to an integrated answer that incorporates information from various inputs and uses the trained knowledge of the large language model to form a response that aligns with the instructions in a prompt or other input. For example, a synthesized response can include a response based on a user input or request. Similarly, as used herein, the term "synthesized summary" refers to an output from a large language model that is a condensed, cohesive overview that distills the main ideas, themes, and/or essential points from a content item into a unified summary. Relatedly, as used herein, the term "answer" refers to an output from a large language model that is a relevant and context-aware response to a user input. In some cases, an answer is a response to a user input of a question about a multimodal content item or a summary of a multimodal content item.

Also, as used herein, the term "prompt data structure" refers to selected and/or organized data, information, or images for use within a prompt for a large language model. Specifically, the term "data structure" refers to a set of data, information, or images selected for use as input for a large language model as part of a prompt (along with instructions and/or other information). In some cases, a prompt data structure can include a set of multimodal representations (or thumbnail images) selected based on embedding distances generated from the multimodal representations (or thumbnail images) compared to text input. In other cases, a prompt data structure can include multimodal representations (or thumbnail images) and instructions to generate output (e.g., summaries) based on the multimodal representations (or thumbnail images).

Moreover, as used herein, the term "machine-learning model" refers to a computer algorithm or a collection of computer algorithms that automatically improve for a particular task through iterative outputs or predictions based on the use of data. For example, a machine-learning model can utilize one or more learning techniques to improve accuracy and/or effectiveness. Example machine-learning models include various types of neural networks, decision trees, support vector machines, linear regression models, and Bayesian networks.

Relatedly, the term "neural network" refers to a machine-learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., content items or smart topic outputs) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each performs tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a machine-learning model.

Similarly, as used herein, the term "multimodal embedding-generating machine-learning model" or "multimodal embedding-generating neural network" refers to a machine-learning model or neural network that is trained or tuned to generate embeddings from multiple modalities and relationships between modalities (e.g., text and images) within a content item. For example, the multimodal embedding-generating machine-learning model generates image embeddings and text embeddings and generates embedding distances between the text embeddings and a user input. In some cases, the multimodal embedding-generating machine-learning model is a contrastive language-image pretraining model ("CLIP" from OpenAI). Moreover, the multimodal embedding-generating machine-learning model can work in combination with a large language model (e.g., GPT from OpenAI).

In addition, as used herein, the term "large language model" refers to a machine-learning model trained to perform computer tasks to generate or identify content items in response to trigger events (e.g., user interactions, such as text queries and button selections). In particular, a large language model can be a neural network (e.g., a deep neural network or a transformer neural network) with many parameters trained on large quantities of data (e.g., unlabeled text) using a particular learning technique (e.g., self-supervised learning). For example, a large language model can include parameters trained to generate outputs (e.g., smart topic outputs) based on prompts and/or to identify content items based on various contextual data, including graph information from a knowledge graph and/or historical user account behavior. In some cases, a large language model comprises various commercially available models such as, but not limited to, GPT (e.g., GPT 3.5, GPT 4, GPT 40), Llama (e.g., Llama2-7B, Llama 3), BERT, Claude, Cohere. Similarly, the term "multimodal large language model" refers to a large language model that can process multiple forms of input. For example, "multimodal large language model" refers to a large language model that can receive a prompt with multiple forms of input, such as text and images. In some cases, a multimodal large language model can be a GPT model from Open AI (e.g., GPT 4o, GPT 4o-mini), Phi-3 Vision from Microsoft, LlaVA model, Chameleon model, or MM1 model.

Additionally, as used herein, the term "multimodal representation" refers to a digital representation of a content item. Specifically, "multimodal representation" refers to a digital depiction that represents or displays content from a content item or a set portion of a content item. For example, a multimodal representation can be a thumbnail image of a page of a document or PDF or a slide from a slide deck. To illustrate, multimodal representations can be a thumbnail image of a content item that are a uniform size (e.g., 512×512 pixels). In some cases, a multimodal representation is generated using a thumbnail generation system of a content management system that generates thumbnails for content item previews for content items within the content management system.

Further, as used herein, the term "multimodal summary" or "thumbnail summary" refers to a summary generated by a large language model or multimodal large language model from multimodal representations or thumbnail images. Specifically, a "multimodal summary" is a synthesized output that summarizes a multimodal representation or set of multimodal representations. For example, a multimodal summary refers to an output that captures the key elements, themes, or information presented visually in a multimodal representation or set of multimodal representations. Similarly, as used herein, the term "textual multimodal summary" or "textual thumbnail summary" refers to a multimodal summary that is a text summary of a multimodal representation or set of multimodal representations.

Also, as used herein, the term "sliding window" refers to a selection from within a set of data or other content. In particular, the term "sliding window" refers to a selection of a set of data of a fixed size (e.g., five units) and additional sliding windows move (or slide) down a set of data (e.g., one unit) and select another set of data of the fixed size. For example, for a set of multimodal representations (or thumbnail images) and a fixed sliding window size of five multimodal representations, an initial sliding window can be a selection of multimodal representations 1-5, an additional sliding window can be a selection of multimodal representations 2-6, a further sliding window can be a selection of multimodal representations 3-7, and so forth until multimodal representations of a content item are selected. In some cases, a sliding window is a variable length based on the size of a content item or the number of multimodal representations corresponding to the content item. In addition, a sliding window can move (or slide) a variable amount of units (e.g., 1 unit or 3 units)

Figure 2:
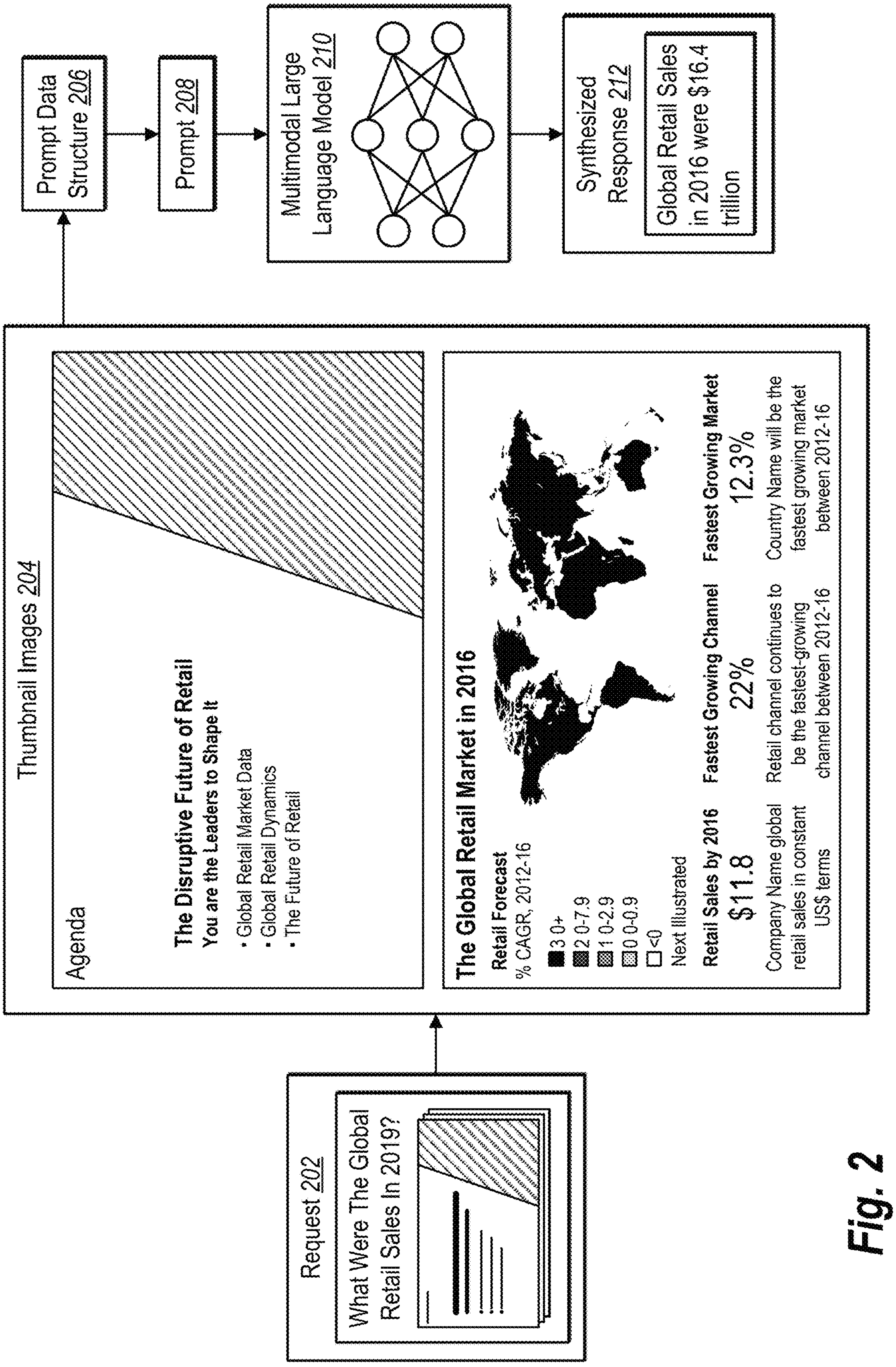
FIG. 2 illustrates an example diagram of a multimodal content response generation system utilizing image content from a multimodal content item to generate a synthesized response in accordance with one or more embodiments.

As previously mentioned, the multimodal content response generation system 100 utilizes a multimodal large language model to generate synthesized responses corresponding to multimodal content items. In particular, the multimodal content response generation system 100 generates synthesized responses using multimodal content from the multimodal content item. FIG. 2 illustrates an example diagram of a multimodal content response generation system utilizing image content from multimodal content item to generate a synthesized response in accordance with one or more embodiments.

As shown, the multimodal content response generation system 100 receives a request 202 to generate a synthesized response corresponding to a multimodal content item. In particular, the multimodal content response generation system 100 receives a request to generate a synthesized response for a content item and determines that the content item is a multimodal content item based on the number of images or the amount of information in images in the content item. For example, a content item can be a multimodal content item if the internal content of the content item is a threshold amount or a percentage of images that depict, display, or portray information or data. To illustrate, images of a multimodal content item can display pictographs, text, objects, scale and perspective, colors, scenes, time indicators, symbols, icons, scale, and perspective within the image that are crucial to understanding data and/or information of the content item.

Moreover, in addition to the visual data or information displayed or depicted within images of the multimodal content item, the multimodal content item can also comprise data and/or information in the placement and/or spacing of images in the multimodal content item. Specifically, the multimodal content item can contain information within the spacing of information within an image or in relation to images to other content (e.g., text, charts, graphs, etc.) within the multimodal content item. For example, an image of a multimodal content item can indicate (e.g., in text) "the highest grossing companies of 2023" and display icons of logos of companies spaced to indicate they are the highest grossing companies (e.g., underneath, next to, or in a listing). As another example, a document can include the text "the highest grossing companies of 2023" with icons of logos companies embedded within the document to indicate they are the highest grossing companies. Indeed, the multimodal content response generation system 100 can extract information, and data conveyed through the spacing of images and content within a multimodal content item regardless of whether the information is within a single image or within various components of the multimodal content item.

In addition, in some embodiments, request 202 is also associated with a user input corresponding to the multimodal content item. Specifically, the multimodal content response generation system 100 receives user input by receiving a text input or a selection of an option to generate a certain type of synthesized response. In some cases, the multimodal content response generation system 100 receives request 202 by receiving an audio or video input as request 202. As shown in FIG. 2, the user input is a text input of "What were the global retail sales in 2016?"

As previously mentioned, the multimodal content response generation system 100 generates multimodal representations of a multimodal content item. As illustrated, in some embodiments, the multimodal content response generation system 100 generates multimodal representations by generating thumbnail images 204. Specifically, the multimodal content response generation system 100 generates thumbnail images 204 corresponding to the multimodal content item and represents the content of the multimodal content item. For example, thumbnail images can represent the pages of a PDF, the slides of a slide deck, and the pages of a document, among others.

In one or more embodiments, the multimodal content response generation system 100 utilizes a thumbnail generator that is part of a content management system to generate thumbnail images 204. For example, the thumbnail generator generates thumbnail images for content item previews and can also generate thumbnail images 204 from sections of multimodal content items. In some cases, the multimodal content response generation system 100 generates thumbnail images 204 upon receiving the request to generate a synthesized response for the multimodal content item. In other cases, the multimodal content response generation system 100 generates thumbnail images 204 upon determining that a content item is a multimodal content item (e.g., satisfies a multimodal content classification). Additional details regarding the multimodal content response generation system 100 determining that a content item is a multimodal content item are provided below with respect to FIG. 5.

In addition, in some embodiments, the multimodal content response generation system 100 accesses saved thumbnail images 204. Specifically, the multimodal content response generation system 100 and/or the content management system cache thumbnail images for multimodal content items, and the multimodal content response generation system 100 accesses the cached thumbnail images. In some cases, the multimodal content response generation system 100 accesses cached thumbnail images generated by the thumbnail generator when generating content item previews (e.g., that preview the content item within the content management system). In other cases, the multimodal content response generation system 100 caches thumbnail images generated in response to requests to generate synthesized responses for a multimodal content item, and the multimodal content response generation system 100 accesses the cached thumbnail images when generating additional synthesized responses for the multimodal content item.

As shown, using thumbnail images 204, the multimodal content response generation system 100 generates prompt data structure 206 for prompt 208. In particular, the multimodal content response generation system 100 selects images from thumbnail images 204 to include in prompt data structure 206. For example, the multimodal content response generation system 100 can select thumbnail images that correspond to the user input in request 202. As another example, the multimodal content response generation system 100 can select sliding windows for thumbnail images to include in prompt 208 (or multiple prompts) for the multimodal large language model to generate multimodal summaries.

As also shown, the multimodal content response generation system 100 the multimodal content response generation system 100 provides the prompt 208 to the multimodal large language model 210 to generate the synthesized response 212. In particular, the multimodal large language model 210 can identify and extract information and data corresponding to request 202 from the thumbnail images included in prompt data structure 206. For example, prompt 208 includes a prompt data structure 206 and the instructions to generate a synthesized response 212 based on request 202. Indeed, the multimodal large language model is able to identify text within the images and placement of content within the thumbnail images to generate synthesized response 212. As shown in FIG. 2, the multimodal content response generation system 100 generates a response that indicates that "global retail sales in 2016 were $11.8 trillion," as depicted in the multimodal content item through both the text and the placement of the text within the thumbnail image.

Figure 3:
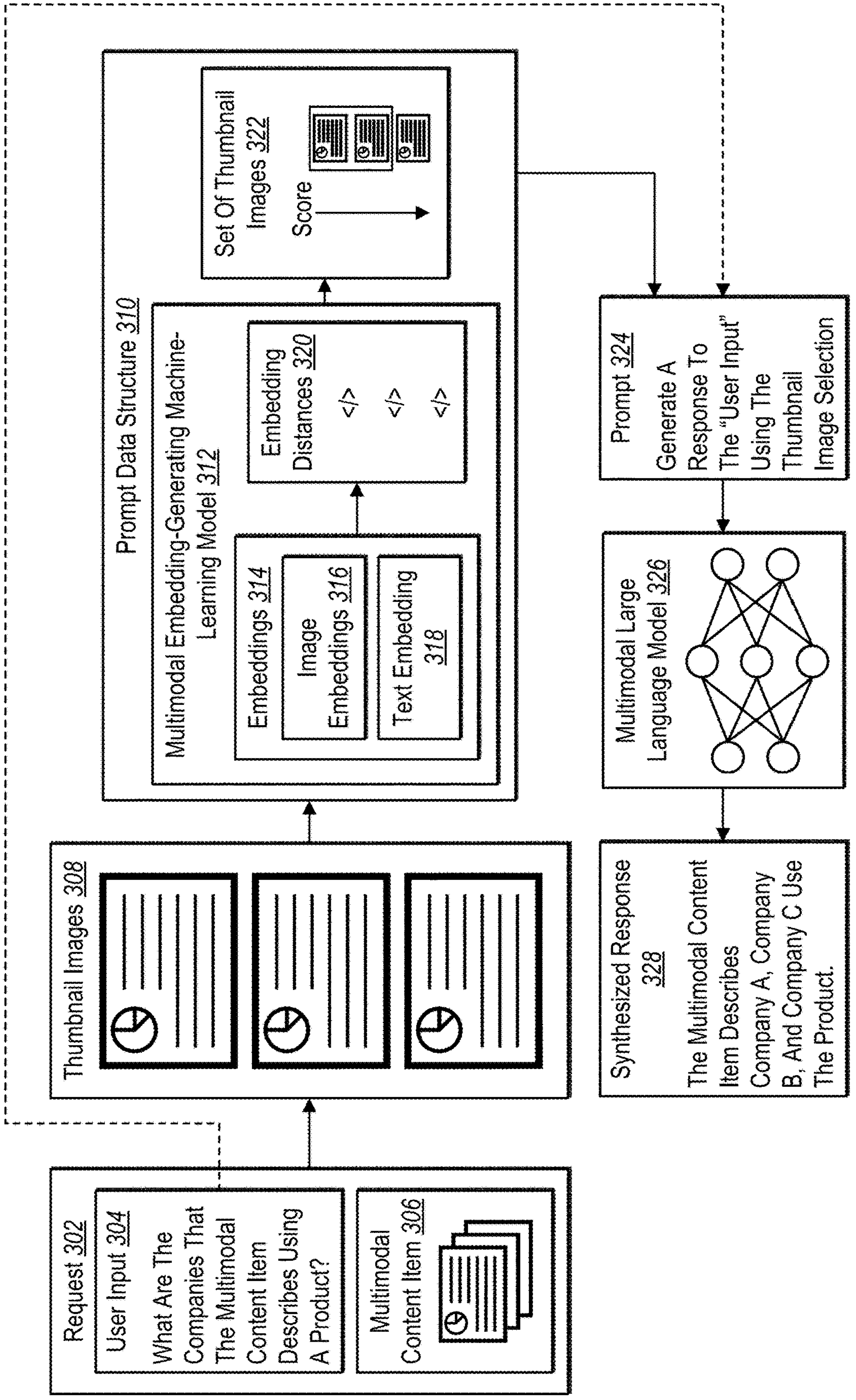
FIG. 3 illustrates a schematic diagram of an answer preprocessing pipeline of a multimodal content response generation system generating a synthesized response comprising an answer to a user input corresponding to a multimodal content item in accordance with one or more embodiments.

As previously mentioned, the multimodal content response generation system 100 generates a synthesized response to a user input about a multimodal content item. In particular, the multimodal content response generation system 100 utilizes an answer preprocessing pipeline that generates a prompt data structure for a multimodal large language model to generate a synthesized response that reflects an answer to the user input. FIG. 3 illustrates a schematic diagram of an answer preprocessing pipeline of a multimodal content response generation system 100 generating a synthesized response comprising an answer to user input corresponding to a multimodal content item in accordance with one or more embodiments.

As shown in FIG. 3, the multimodal content response generation system 100 receives request 302, which includes a user input 304 corresponding to multimodal content item 306. In particular, the multimodal content response generation system 100 elects to use an answer preprocessing pipeline when request 302 includes user input 304 requesting a synthesized response corresponding to multimodal content item 306. In some cases, user input 304 includes text input of a desired output (e.g., a question) corresponding to multimodal content item 306. For instance, as shown, the multimodal content response generation system 100 can receive user input 304 of "What are the companies that the multimodal content item describes using the product?" indicating synthesized response 328 should indicate what companies use the product.

As also shown, the multimodal content response generation system 100 generates thumbnail images 308. Specifically, the multimodal content response generation system 100 generates thumbnail images 308 in response to receiving request 302 and determining that the content item is a multimodal content item. Indeed, based on determining that the content item is a multimodal content item, the multimodal content response generation system 100 will generate thumbnail images of the multimodal content item, regardless of whether the multimodal content response generation system 100 will utilize an answer preprocessing pipeline or a summary preprocessing pipeline.

In one or more embodiments, the multimodal content response generation system 100 generates thumbnail images 308 by generating images that depict the content of multimodal content item 306. For example, the multimodal content response generation system 100 generates thumbnail images 308 as low-resolution images (e.g., 512×512 pixels) that represent or depict various sections of the multimodal content item 306. In some instances, when multimodal content item 306 has multiple pages or sections, such as a PDF or document with lots of pages or a slide deck with multiple slides, the multimodal content response generation system 100 generates a plurality of images as thumbnail images 308. In other instances, when multimodal content item 306 has only a single section, such as an image, screenshot, infographic, or file with only one page, the multimodal content response generation system 100 generates thumbnail images 308 by generating a single thumbnail image to represent multimodal content item 306.

Further, as illustrated, the multimodal content response generation system 100 generates a prompt data structure 310. Specifically, when using the answer preprocessing pipeline, the multimodal content response generation system 100 generates prompt data structure 310 by selecting thumbnail images from thumbnail images 308 that are associated with the user input. Indeed, by intelligently selecting thumbnail images for prompt data structure 310, the multimodal content response generation system 100 generates synthesized responses that accurately relate to the user input without requiring the multimodal large language model to needlessly process large numbers of thumbnail images.

As shown, in one or more embodiments, the multimodal content response generation system 100 generates prompt data structure 310 by using output from multimodal embedding-generating machine-learning model 312 to select a set of thumbnail images 322 from thumbnail images 308. In particular, multimodal embedding-generating machine-learning model 312 is a machine-learning model that can receive multimodal input and generate output that quantifies the relationship between the multimodal input. For example, multimodal embedding-generating machine-learning model 312 is trained to use natural language descriptions to recognize objects and concepts in images based on the meaning conveyed in the text. In some cases, the multimodal embedding-generating machine-learning model 312 is a contrastive language-image pretraining model (CLIP) from OpenAI.

In some embodiments, as illustrated, the multimodal embedding-generating machine-learning model 312 generates embeddings 314 that include image embeddings 316 and text embedding 318. In particular, multimodal embedding-generating machine-learning model 312 generates image embeddings 316 from thumbnail images 308 and text embedding 318 from user input 304. For example, the multimodal embedding-generating machine-learning model 312 generates image embeddings 316 and text embedding 318 as high-dimensional vector representations. The multimodal embedding-generating machine-learning model 312 uses a vision encoder to generate a vector (e.g., a dense vector) representing the content and features of the image and a text encoder to process a user input 304 and convert it into text embedding 318 that captures the meaning of the text.

The multimodal embedding-generating machine-learning model 312 can further generate embedding distances 320 based on image embeddings 316 and text embedding 318. In particular, multimodal embedding-generating machine-learning model 312 generates embedding distances for image embeddings 316 and text embedding 318 in a shared vector space, such as through a cosine similarity or Euclidian distance that reflects the similarity between an image embedding and a text embedding. For example, a lower embedding distance between an image embedding and a text embedding indicates that the thumbnail image corresponding to the image embedding has a higher similarity with the user input 304. A higher embedding distance between an image embedding and a text embedding indicates a lower similarity between the thumbnail image corresponding to the image embedding and user input 304.

Moreover, the multimodal content response generation system 100 generates prompt data structure 310 by selecting a set of thumbnail images 322 from thumbnail images 308 based on embedding distances 320. Specifically, the multimodal content response generation system 100 generates scores for thumbnail images of thumbnail images 308 based on the embedding distances and ranks the thumbnail images based on the score. The multimodal content response generation system 100 can then select a k number of thumbnail images as the set of thumbnail images 322 for the prompt data structure 310. For example, the k number of thumbnails can be the top five thumbnail images or the top three thumbnail images, based on the score.

The multimodal content response generation system 100 can then generate prompt 324 for multimodal large language model 326 to generate synthesized response 328. In particular, the multimodal content response generation system 100 generates prompt 324 that includes a prompt data structure 310 and various instructions for multimodal large language model 326 to generate synthesized response 328. For example, prompt 324 can include user input 304 (or a portion of user input 304), relevant context, and/or custom instructions regarding synthesized response 328.

The multimodal content response generation system 100 can generate multiple types of responses for synthesized response 328. Specifically, the multimodal large language model 326 is capable of generating various forms of output, and the multimodal content response generation system 100 can indicate an output from the synthesized response 328. For example, the multimodal content response generation system 100 can include specifications for synthesized response 328 in prompt 324, such as type of content to generate (e.g., text, video, audio, image), length of output, style, or other indications.

In one or more embodiments, the multimodal content response generation system 100 includes specifications in the prompt based on user input 304. For example, text input in user input 304 can include specifications for synthesized response 328, and the multimodal content response generation system 100 can include the specifications in prompt 324. As another example, user input 304 can include a selection of options to generate a certain type of output for synthesized response 328.

Figure 4:
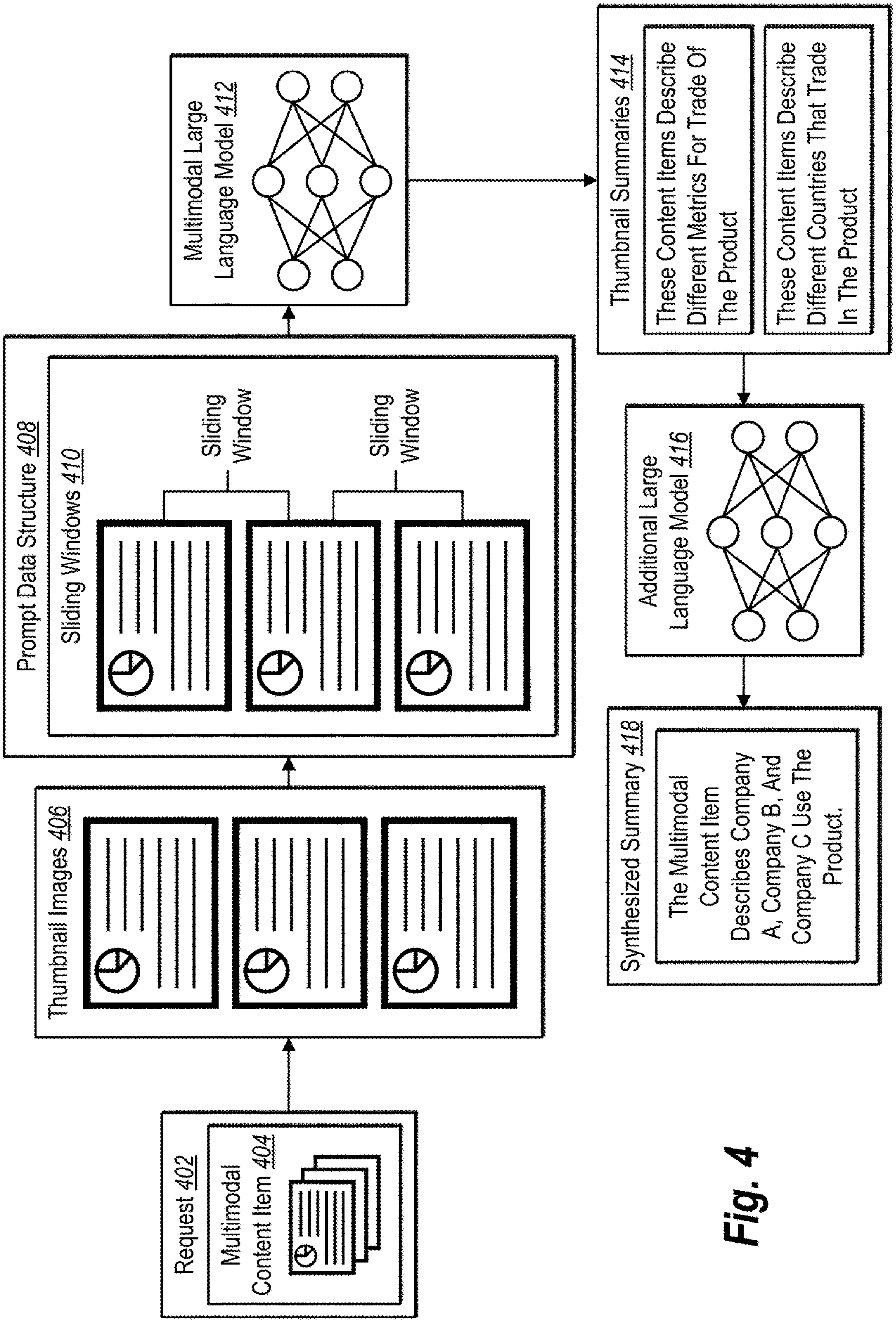
FIG. 4 illustrates a schematic diagram of a summary preprocessing pipeline of a multimodal content response generation system generating a synthesized summary for a multimodal content item in accordance with one or more embodiments.

As previously mentioned, in one or more embodiments, the multimodal content response generation system 100 generates a synthesized summary for a multimodal content item. Specifically, the multimodal content response generation system 100 utilizes a summary preprocessing pipeline that utilizes the multimodal large language model and an additional large language model to generate a synthesized summary for a multimodal content item. FIG. 4 illustrates a schematic diagram of a summary preprocessing pipeline of a multimodal content response generation system generating a synthesized summary for a multimodal content item in accordance with one or more embodiments.

As shown in FIG. 4, the multimodal content response generation system 100 receives request 402 to generate a synthesized summary for multimodal content item 404. In particular, the multimodal content response generation system 100 elects to use the summary preprocessing pipeline when request 402 is a request to generate a synthesized summary. In some cases, the multimodal content response generation system 100 receives request 402 to generate a synthesized summary by receiving a user selection of an option within a content management system interface (or a summarize and answer interface) to generate a synthesized summary for a multimodal content item. Additional details and examples of options to generate a synthesized summary are provided below with respect to FIGS. 6A-6C.

As also shown, the multimodal content response generation system 100 generates thumbnail images 406. Specifically, the multimodal content response generation system 100 generates thumbnail images 406 in response to receiving request 402 and determining that the content item is a multimodal content item. Indeed, based on determining that the content item is a multimodal content item, the multimodal content response generation system 100 will generate thumbnail images, regardless of whether the multimodal content response generation system 100 will utilize an answer preprocessing pipeline or a summary preprocessing pipeline.

In one or more embodiments, the multimodal content response generation system 100 generates thumbnail images 406 by generating images that represent the content of multimodal content item 404. For example, the multimodal content response generation system 100 generates thumbnail images 406 as low-resolution images that represent or depict various sections of multimodal content item 404. In some instances, when multimodal content item 404 has multiple pages or sections, such as a PDF or document with lots of pages or a slide deck with multiple slides, the multimodal content response generation system 100 generates a plurality of images as thumbnail images 406. In other instances, when multimodal content item 404 has only a single section, such as an image, screenshot, infographic, or file with only one page, the multimodal content response generation system 100 generates thumbnail images 406 by generating a single thumbnail image to represent multimodal content item 404.

Further, as illustrated, the multimodal content response generation system 100 generates prompt data structure 408. In particular, when utilizing the summary preprocessing pipeline, the multimodal content response generation system 100 generates prompt data structure 408 by selecting sliding windows 410 of thumbnail images 406. For example, the multimodal content response generation system 100 selects sliding windows 410 by selecting a sliding window of sliding window size of t thumbnail images, then selecting an additional sliding window of t thumbnail images offset by w thumbnail images. To illustrate, the multimodal content response generation system 100 could select sliding windows with a sliding window size of 5 thumbnail images by selecting a first sliding window of thumbnail images 1-5, a second sliding window of thumbnail images 2-6, a third sliding window of thumbnail images 3-7, and so forth throughout thumbnail images 406.

In one or more embodiments, the multimodal content response generation system 100 dynamically selects sliding window sizes. Specifically, the multimodal content response generation system 100 selects a sliding window size based on the size of multimodal content item 404 or a number of thumbnail images 406 from multimodal content item 404. For example, for the multimodal content response generation system 100 can select a sliding window size for a multimodal content item by generating x sliding windows for the multimodal content item, which will vary in length based on thumbnail images 406. To illustrate, various multimodal content items can have the same number of sliding windows but sliding windows will have a varying number of thumbnail images in each sliding window based on the number of thumbnail images. As another example, the multimodal content response generation system 100 can generate sliding windows based on the number of thumbnail images satisfying various thumbnail image divisions. To illustrate, the multimodal content response generation system 100 can generate sliding windows of t thumbnail images if the number of thumbnail images satisfies a first division, sliding windows of l thumbnail images if the number of thumbnail images satisfies a second division, and sliding windows of w thumbnail images if the number of thumbnail images satisfies a third division.

As illustrated, the multimodal content response generation system 100 provides prompt data structure to multimodal large language model 412 to generate thumbnail summaries 414. In particular, the multimodal content response generation system 100 provides the prompt data structure by providing sliding windows 410 of prompt data structure 408 to the multimodal large language model to generate thumbnail summaries 414. Each thumbnail summary is a text summary that summarizes the critical and relevant points from the thumbnail images in the corresponding sliding window. For example, for a sliding window of five thumbnail images, a thumbnail summary would summarize the critical and relevant points in the five thumbnail images.

In one or more embodiments, the multimodal content response generation system 100 provides prompt data structure 408 by providing the sliding windows 410 within separate prompts to multimodal large language model 412 to generate thumbnail summaries 414. In addition, in some embodiments, the multimodal content response generation system 100 provides the thumbnail summaries in parallel to multimodal large language model 412 with a single prompt to generate thumbnail summaries for the sliding windows.

Further, as shown, the multimodal content response generation system 100 provides thumbnail summaries 414 to additional large language model 416 to generate synthesized summary 418. In particular, the multimodal content response generation system 100 provides the textual thumbnail summaries to additional large language model 416 to generate synthesized summary 418 that captures the core content for multimodal content item 404 based on the textual thumbnail summaries. For example, the multimodal content response generation system 100 provides textual thumbnail summaries to additional large language model 416 to generate a synthesized summary 418 as a text summary of multimodal content item 404.

Figure 5:
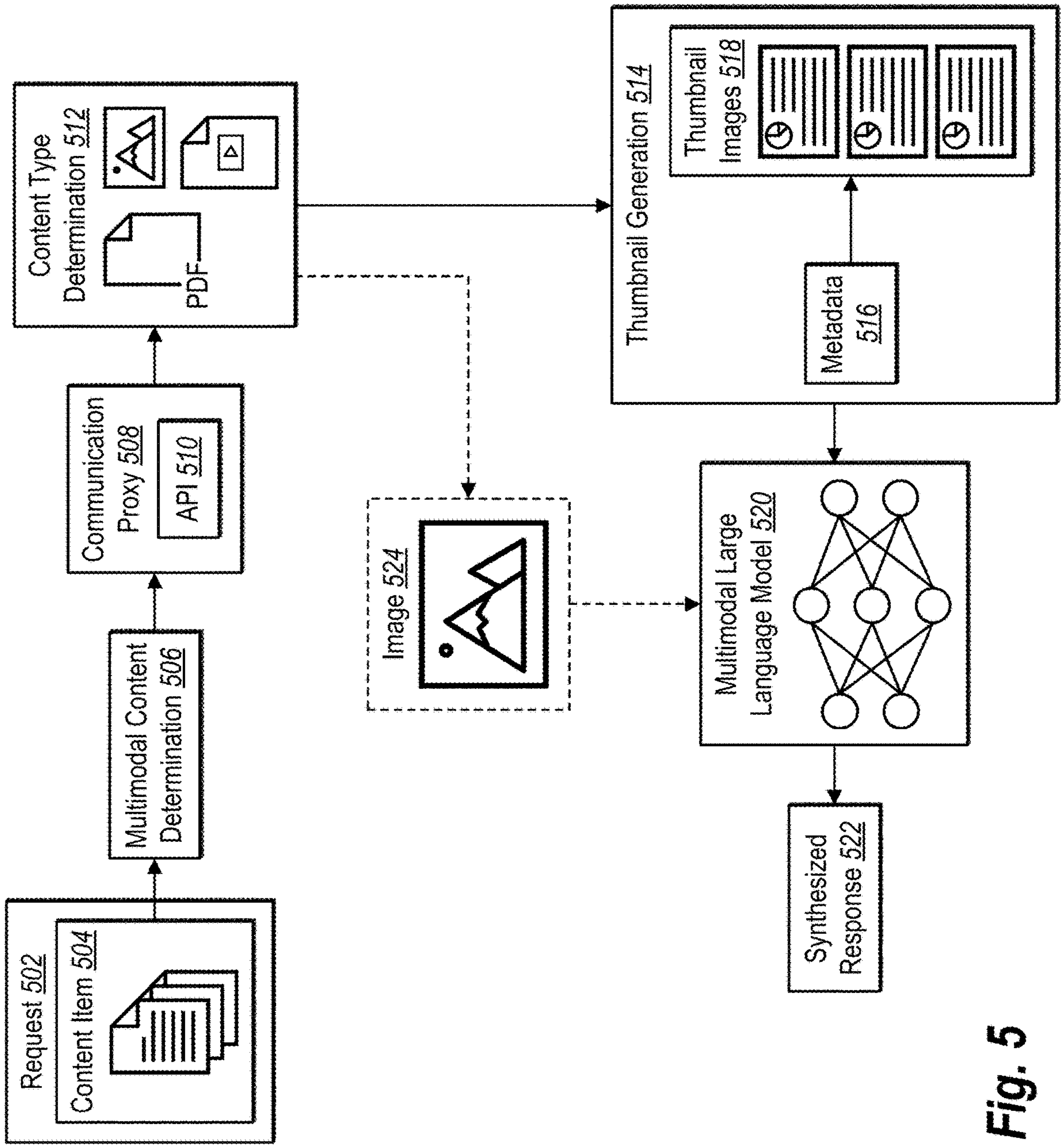
FIG. 5 illustrates a multimodal content response generation system generating a multimodal content classification for a content item and generating thumbnail images in accordance with one or more embodiments.

As previously mentioned, the multimodal content response generation system 100 generates a multimodal content classification for a content item. In particular, the multimodal content response generation system 100 determines whether a content item satisfies a multimodal content classification and generates thumbnail images for a multimodal large language model. FIG. 5 illustrates a multimodal content response generation system generating a multimodal content classification for a content item and generating thumbnail images in accordance with one or more embodiments.

As shown, in response to receiving request 502 to generate a synthesized response for content item 504, the multimodal content response generation system 100 generates a multimodal content classification 506. In particular, the multimodal content response generation system 100 analyzes content item 504 to determine an amount of image content within content item 504 and generates multimodal content classification 506 based on the amount of image content. For example, if the multimodal content response generation system 100 determines that content item 504 has a threshold amount of image content, the multimodal content response generation system 100 determines that the content item satisfies multimodal content classification 506 and that content item 504 is a multimodal content item.

In some cases, if content item 504 does not satisfy multimodal content classification 506, the multimodal content response generation system 100 determines that the content item 504, or a portion of content item 504, is a text-based content item and determines to process the content item using a large language model rather than the multimodal large language model (e.g., additional large language model 416). In these cases, the multimodal content response generation system 100 can merge content item 504 with other content items or merge text portions of content item 504 processed with the large language model with image portions of content item 504 processed with the multimodal large language model.

As illustrated, based on generating multimodal content classification 506, the multimodal content response generation system 100 utilizes a communication proxy 508 to access the content of content item 504 and make content type determination 512. Specifically, communication proxy 508 enables the multimodal content response generation system 100 to securely access content items at various additional third-party applications. For example, communication proxy 508 allows the multimodal content response generation system 100 to access content and/or data from content items at third-party cloud-based (e.g., SaaS) applications in a secure way that allows for on-demand access to content items at the third-party applications. In some embodiments, communication proxy 508 is a Janus proxy that acts as a gateway between the multimodal content response generation system 100 and a variety of Janus servers with access to various content systems (including content management system 804).

In one or more embodiments, the multimodal content response generation system 100 connects to a third-party application through a sync coordination system as described in U.S. application Ser. No. 18/776,830, entitled DATA INGESTION UTILIZING A COORDINATOR AND CONNECTORS, filed on Jul. 18, 2024, which is hereby incorporated by reference in its entirety.

As further shown, the communication proxy 508 can utilize an API 510 to access the content of the content item 504 in order to make content type determination 512. For example, the multimodal content response generation system 100 utilizes API 510 to access certain types of content and/or content items. For example, the multimodal content response generation system 100 uses API 510 to access content items from a Google system or to access raw PDF bytes of a PDF file. In some cases, if the content item is stored directly within a content management system associated with the multimodal content response generation system 100), the multimodal content response generation system 100 utilizes a first-party API to access content from content item 504 (e.g., bypassing communication proxy 508).

In one or more embodiments, when a content item is connected to the content management system through a URL, the multimodal content response generation system 100 utilizes the URL and API 510 to access the content item. Specifically, the multimodal content response generation system 100 utilizes the URL to determine a branded type for content item 504 and utilizes an API specific to the branded type. For example, if the multimodal content response generation system 100 determines, based on the URL, that the content item is a Google-branded content item, the multimodal content response generation system 100 will utilize an API with a Google system to access content of a content item within the Google system.

As mentioned, the multimodal content response generation system 100 utilizes communication proxy 508 to access content of content item 504 in order to generate content type determination 512. In particular, the multimodal content response generation system 100 makes content type determination 512, which indicates a content type for content item 504. For example, the multimodal content response generation system 100 can generate content type determination 512 by identifying a file type of content item 504, such as a PDF, a slide of a slide deck, an image file, a Google doc, a Google slide deck, or other content item type.

Based on content type determination 512, the multimodal content response generation system 100 utilizes thumbnail generator 514 to generate thumbnail images 518 from content item 504. For example, thumbnail generator 514 can be a thumbnail generator associated with the content management system and generates thumbnail images for previews of content items with the content management system. In some instances, thumbnail generator 514 accesses metadata 516 of content item 504 to generate thumbnail images 518.

The multimodal content response generation system 100 can then provide thumbnail images 518 to multimodal large language model 520 to generate synthesized response 522. For example, the multimodal content response generation system 100 utilizes an answer preprocessing pipeline or a summary preprocessing pipeline to process thumbnail images 518 for a prompt data structure based on request 502 to generate a synthesized response or a synthesized summary.

As shown, in one or more embodiments, if content type determination 512 indicates the content item is an image, the multimodal content response generation system 100 can provide image 524 to multimodal large language model 520. Specifically, for image 524, the multimodal content response generation system 100 will not generate thumbnail images but will provide image 524 to multimodal large language model 520 to generate synthesized response 522. However, if image 524 is above an image size threshold, the multimodal content response generation system 100 will utilize thumbnail generator 514 to generate a thumbnail image to use with multimodal large language model 520.

Figure 6A:
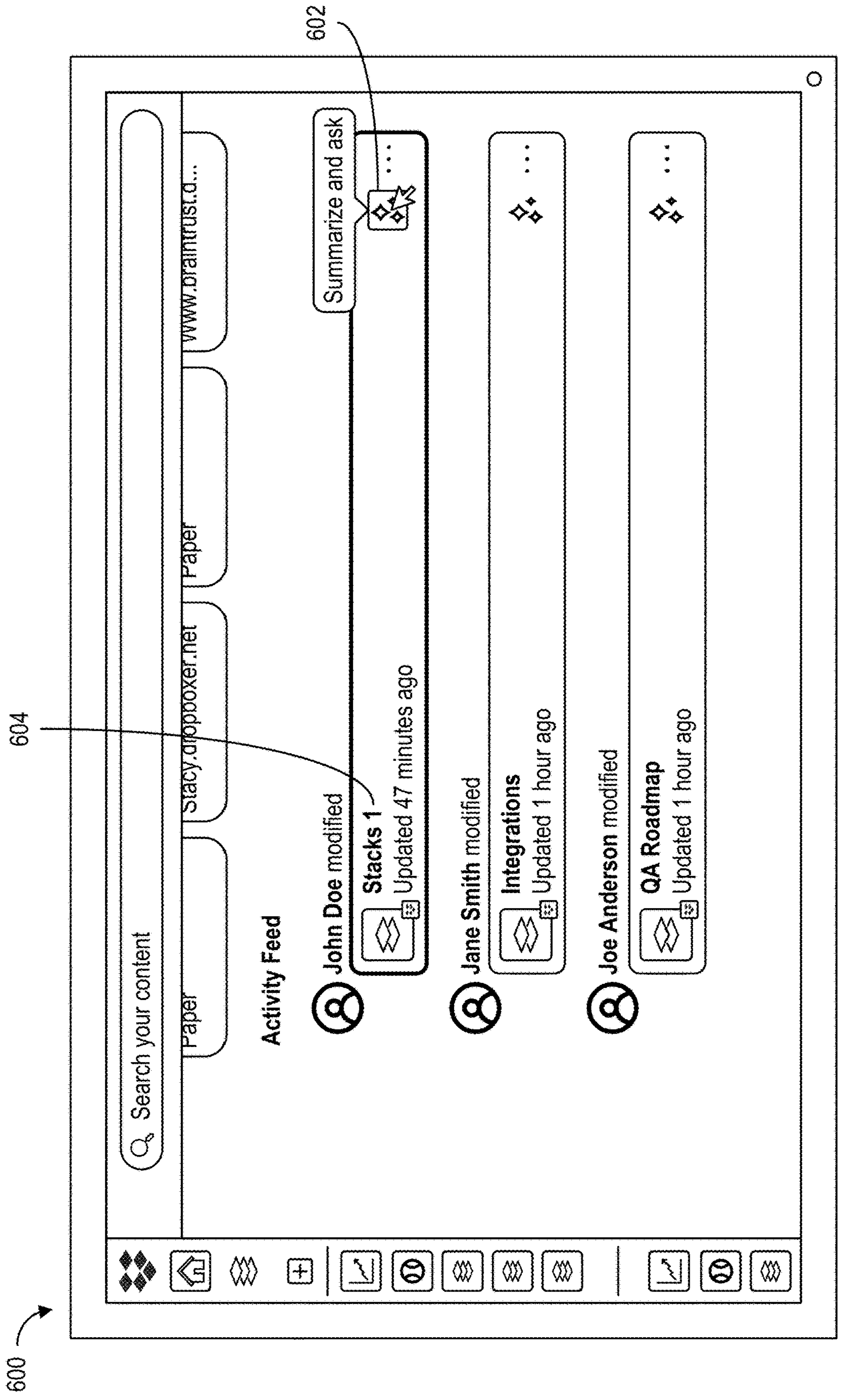
FIGS. 6A-6C illustrate example graphical user interfaces of a multimodal content response generation system with options for receiving a request for a multimodal large language model to generate a synthesized response for a multimodal content item in accordance with one or more embodiments.
Figure 6B:
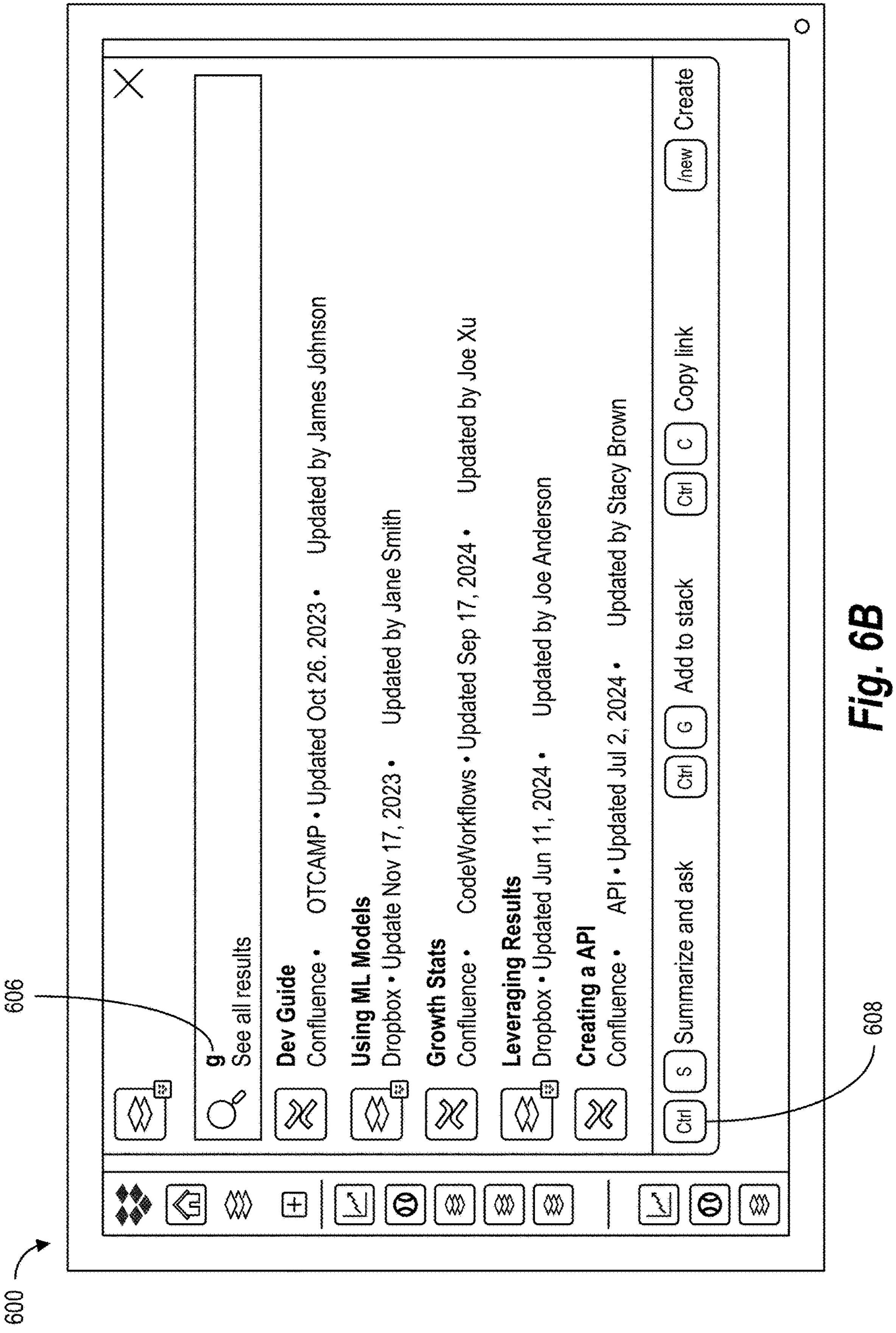
Figure 6C:
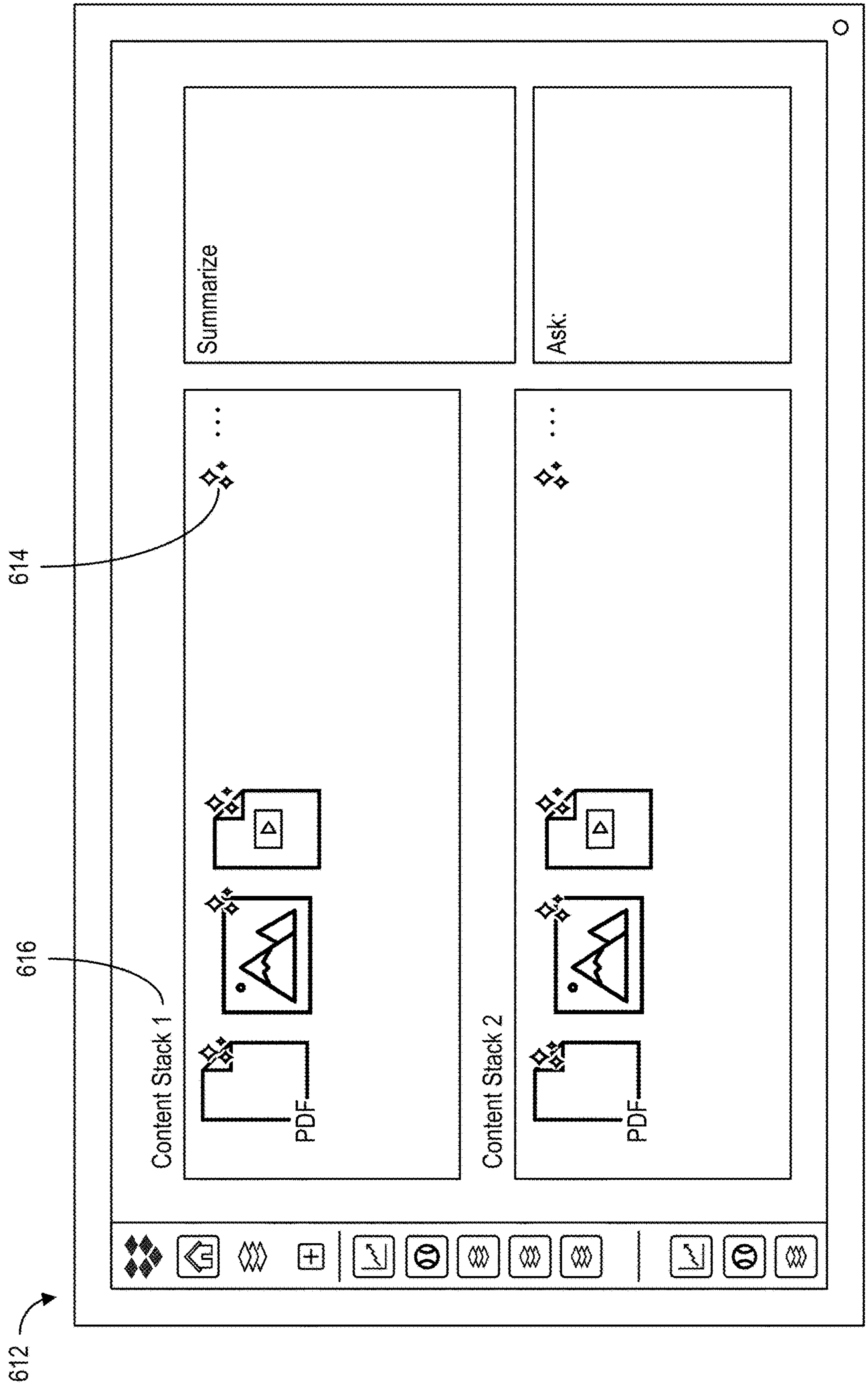

As previously mentioned, the multimodal content response generation system 100 receives requests to generate synthesized responses corresponding to multimodal content items. In particular, the multimodal content response generation system 100 receives requests to generate synthesized responses from within user interfaces on a client device. FIGS. 6A-6C illustrate example graphical user interfaces of a multimodal content response generation system with options receiving a request for a multimodal large language model to generate a synthesized response for a multimodal content item in accordance with one or more embodiments.

As shown in FIG. 6A, the multimodal content response generation system 100 can receive a request to generate a synthesized response by receiving a selection of option 602 to generate a synthesized response from within content management interface 600 on a client device. In some cases, a selection of option 602 can indicate a request to generate a synthesized summary of the corresponding content item 604. In other cases, a selection of option 602 can generate an interface (or window of an interface) to receive user input requesting a synthesized response.

In one or more embodiments, content management interface 600 is an intelligent assistance interface that can adaptively change its appearance for presenting and interacting with different content items from various sources. Specifically, based on receiving a user interaction for performing a particular task or action or for answering a particular question, a content management system can utilize a large language model to analyze a user-account-specific knowledge graph to generate or identify a corresponding content item to provide for display within an intelligent assistant interface. In some cases, as part of providing a generated or identified content item for display, the multimodal content response generation system 100 or the content management system can transform the size and shape of the intelligent assistance interface to accommodate a content item and/or corresponding information about the content item. For example, when the content management system or the multimodal content response generation system 100 surfaces a content item within a modified intelligent assistant interface, the multimodal content response generation system 100 can include option 602 to generate synthesized responses for the content item.

In some embodiments, upon receiving a selection of option 602, the multimodal content response generation system 100 generates a multimodal content classification for the content item. In particular, the multimodal content response generation system 100 displays option 602 within content management interface 600 and, based on the selection, generates the multimodal content classification that indicates whether or not the content item is a multimodal content item. If the content item is a multimodal content item, the multimodal content response generation system 100 generates thumbnail images and processes the thumbnail images according to the answer preprocessing pipeline or the summary preprocessing pipeline.

As shown in FIG. 6B, the multimodal content response generation system 100 can also receive a user input requesting to generate a synthesized response for a content item within search interface 606 of content management interface 600. Specifically, based on receiving a user input within search interface 606 (and pressing enter), the multimodal content response generation system 100 can generate a list of search results and options 608 for performing additional actions for content items displayed based on the user input. For example, as shown, the multimodal content response generation system 100 can display keys that, when selected on a client device, will generate a synthesized summary or generate an interface for entering user input requesting a synthesized response.

As shown in FIG. 6C, the multimodal content response generation system 100 can also receive a request to generate a synthesized summary or a synthesized response for a content stack. Specifically, the multimodal content response generation system 100 receives a selection of option 614 from within a content stack interface 612 to generate a synthesized response and/or synthesized summary for the content stack 616. Based on receiving a user selection of option 614, the multimodal content response generation system 100 can determine if content items of content stack 616 are multimodal content items (e.g., generate multimodal content classifications for the content items). If content items of content stack 616 are multimodal content items, the multimodal content response generation system 100 can generate thumbnail images and process them according to the answer preprocessing pipeline or the summary preprocessing pipeline.

In some embodiments, when content stack 616 includes multimodal content items and text-based content items, the multimodal content response generation system 100 can utilize multiple large language models to generate summaries before using a large language model to generate a synthesized summary. Specifically, the multimodal content response generation system 100 can utilize the multimodal large language model to generate thumbnail summaries (e.g., as described above in relation to FIG. 4) for multimodal content items of content stack 616 and a large language model to generate summaries of the text-based content items. For example, the multimodal content response generation system 100 can then utilize a large language model (e.g., additional large language model 416) to generate a synthesized summary of content stack 616. In some cases, the multimodal content response generation system 100 will generate synthesized summaries of multimodal content items in content stack 616 (e.g., as described above in relation to FIG. 4) and summaries for text-based content items in content stack 616. The multimodal content response generation system 100 can utilize a large language model (e.g., additional large language model 416) to generate a synthesized summary using the synthesized summaries of multimodal content items and summaries of text-based content items.

Figure 7:
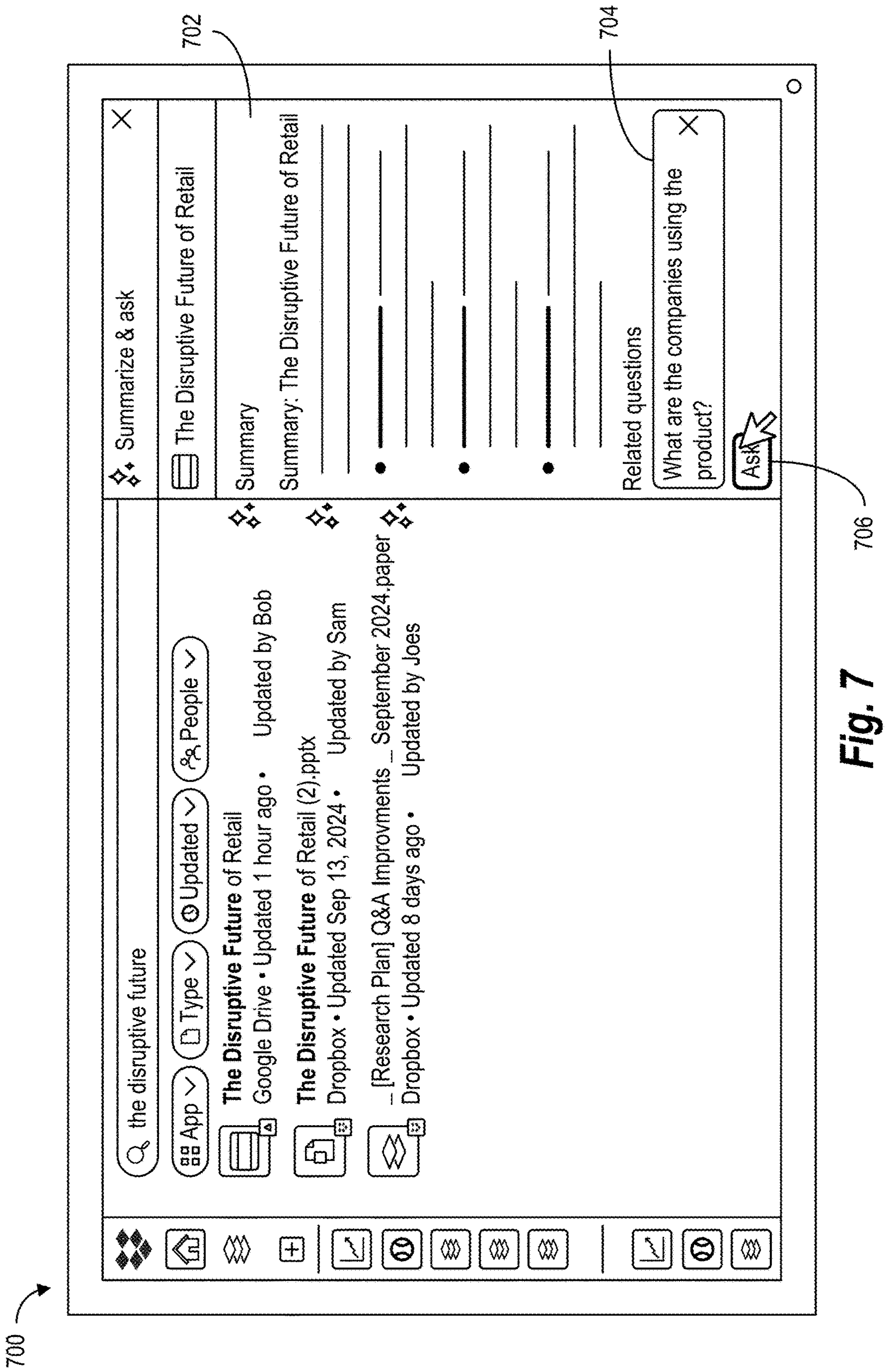
FIG. 7 illustrates an example summarize and ask interface of a multimodal content response generation system providing a synthesized response for display on a client device in accordance with one or more embodiments.

As previously mentioned, the multimodal content response generation system 100 provides a synthesized response for display on a client device. In particular, the multimodal content response generation system 100 can display the synthesized response within a summarize and ask interface on a client device. FIG. 7 illustrates an example summarize and ask interface of the multimodal content response generation system 100 providing a synthesized response for display on a client device in accordance with one or more embodiments.

As shown, the multimodal content response generation system 100 displays a synthesized response in a display window 702 of summarize and ask interface 700. In particular, the multimodal content response generation system 100 generates a summary and ask interface that includes display window 702 for providing a display of a synthesized summary and/or synthesized response to a user input. For example, in some cases, the multimodal content response generation system 100 generates a summarize and ask interface based on receiving a selection of an option to generate a synthesized response. In other cases, the multimodal content response generation system 100 generates a summary and ask interface 700 based on generating a synthesized response for a multimodal content item. Though display window 702 displays a synthesized summary in FIG. 7, it is understood that display window 702 can also display a synthesized response to a user input.

In one or more embodiments, the multimodal content response generation system 100 displays the synthesized response in display window 702 as the multimodal large language model (or the additional large language model) generates the synthesized response. In particular, the multimodal content response generation system 100 displays the text of the synthesized response line by line as the multimodal large language model or the additional large language model generates the synthesized response. For example, the multimodal content response generation system 100 displays the text line by line to reduce latency waiting for the entire synthesized response before displaying the synthesized response on the client device.

The multimodal content response generation system 100 can provide multiple types of synthesized responses in display window 702. For example, the multimodal content response generation system 100 generates a text output as a synthesized response. In addition, the multimodal content response generation system 100 can generate other forms of output for the synthesized response. For instance, the multimodal content response generation system 100 can generate audio content, visual representations, or video content corresponding to the multimodal content item. Indeed, the summary and ask interface is capable of displaying a wide variety of output in display window 702.

In some embodiments, the multimodal content response generation system 100 generates a synthesized response in a format (or type) of output indicated in a request to generate a synthesized response. Specifically, a user input corresponding to a request to generate a synthesized output can request the output to be in a specified format. For example, a request to generate a synthesized output can request a synthesized video summary of a corresponding multimodal content item. As another example, a request to generate a synthesized output can request a synthesized visual representation (or image) of a corresponding multimodal content item.

In one or more embodiments, the multimodal content response generation system 100 generates additional synthesized responses based on receiving additional user input within option 704 and/or a selection of option 706. Specifically, the multimodal content response generation system 100 can receive additional user input within option 704 and/or a selection of option 706 corresponding to the synthesized response (e.g., a question about the synthesized response) and the multimodal content response generation system 100 generates an additional synthesized response for the multimodal content item.

In some embodiments, the multimodal content response generation system 100 utilizes cached or stored data to generate an additional synthesized response. In particular, the multimodal content response generation system 100 caches or stores data when generating a synthesized response and uses the stored data to generate the additional synthesized response. For example, when generating a synthesized response for a multimodal content item, the multimodal content response generation system 100 can cache thumbnail images and then utilize the cached thumbnail images when generating an additional synthesized response. As another example, the multimodal content response generation system 100 can cache thumbnail summaries when generating a synthesized summary for a multimodal content item and utilize the thumbnail summaries to generate an additional synthesized response for the multimodal content item.

Figure 8:
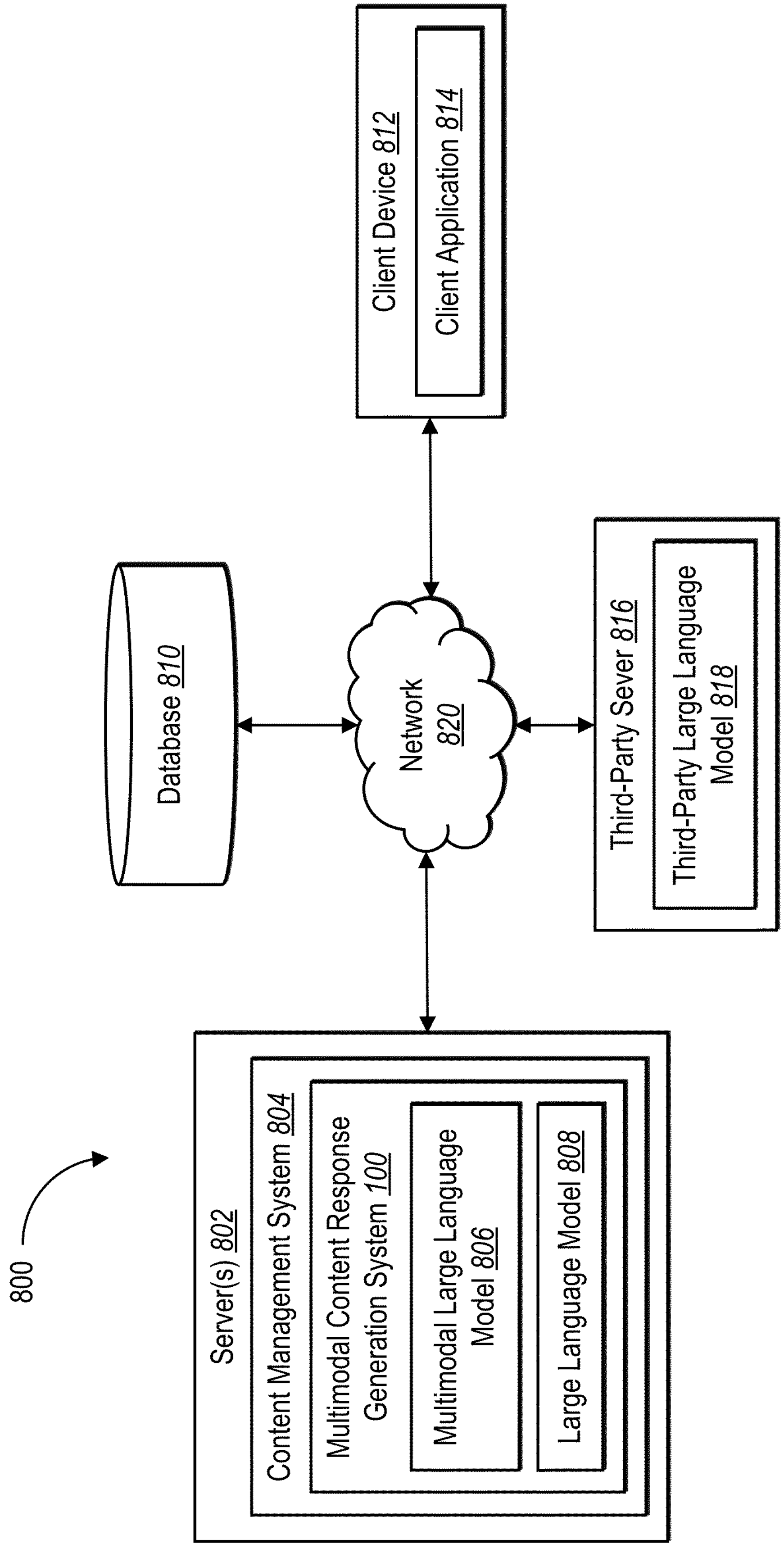
FIG. 8 illustrates a diagram of an environment in which a multimodal content response generation system can operate in accordance with one or more embodiments.

As previously mentioned, the multimodal content response generation system 100 utilizes a multimodal large language model to generate synthesized responses (e.g., summaries or answers to user input) corresponding to multimodal content items. In particular, the multimodal content response generation system 100 utilizes various devices, servers, and networks for storing, synchronizing, and communicating regarding content items. FIG. 8 illustrates a schematic diagram of an environment in which a multimodal content response generation system 100 can operate in accordance with one or more embodiments.

As shown, environment 800 includes server(s) 802, database 810, client device 812, and third-party server 816. Each of the components of environment 800 can communicate via network 820, and network 820 may be any suitable network over which computing devices can communicate. Example networks are discussed in more detail in relation to FIGS. 9-11

As mentioned above, the environment 800 includes client device 812. The client device 812 can be one of a variety of computing devices, including a smartphone, a tablet, a smart television, a desktop computer, a laptop computer, a virtual reality device, an augmented reality device, or another computing device as described in relation to FIGS. 9-11 The client device 812 can communicate with the server(s) 802 via network 820. For example, the client device 812 can receive user input from a user interacting with client device 812 (e.g., via the client application 814) to, for instance, receive user interactions with content items. In addition, the multimodal content response generation system or the server(s) 802 can receive information relating to various interactions with content items and/or user interface elements based on the input received by the client device 812.

As shown, the client device 812 can include a client application 814. In particular, the client application 814 may be a web application, a native application installed on the client device 812 (e.g., a mobile application, a desktop application, etc.), or a cloud-based application where all or part of the functionality is performed by the server(s) 802. Based on instructions from the client application 814, the client device 812 can present or display information, including a user interface for interacting with interface elements for requesting synthesized responses. Using the client application 814, the client device 812 can perform (or request to perform) various operations, such as displaying synthesized output.

As further illustrated in FIG. 8, environment 800 includes the third-party server 816 that hosts the third-party machine-learning model 818. In particular, the third-party machine-learning model 818 communicates with the server(s) 802, the client device 812, the database 810, and/or the third-party server 816 for the multimodal content response generation system 100 to provide data. For example, the multimodal content response generation system 100 provides domain-specific language segments to the third-party machine-learning model 818, where the domain-specific language segments indicate data for generating results for various subcomponents. Indeed, the third-party machine-learning model 818 can include a machine-learning model powered by neural networks or other machine-learning architectures for generating responses to text queries. In some cases, the third-party machine-learning model 818 can refer to various third-party machine-learning models (e.g., CLIP, ChatGPT, Lambda, Llama, BERT, ROBERTa, Turing-NLG, T5, XLNet).

As illustrated in FIG. 8, the environment 800 also includes the server(s) 802. The server(s) 802 may generate, track, store, process, receive, and transmit electronic data, such as synthesized output, requests to generate synthesized output, interactions with interface elements, and/or interactions between user accounts or client devices. For example, the server(s) 802 may receive an indication from the client device 812 of a user interaction selecting an option for generating a synthesized response (or synthesized summary) or user input corresponding to a multimodal content item (e.g., a question about the multimodal content item). In addition, the server(s) 802 can transmit data to the client device 812 in the form of a synthesized response. Indeed, the server(s) 802 can communicate with the client device 812 to send and/or receive data via network 820. In some implementations, the server(s) 802 comprise(s) a distributed server, whereas the server(s) 802 include(s) a number of server devices distributed across the network 820 and located in different physical locations. The server(s) 802 can comprise one or more content servers, application servers, container orchestration servers, communication servers, web-hosting servers, machine learning servers, and other types of servers.

As shown in FIG. 8, the server(s) 802 can also include the multimodal content response generation system 100 as part of the content management system 804. The content management system 804 can communicate with the client device 812 to perform various functions associated with the client application 814, such as managing user accounts and/or identifying content items. Indeed, content management system 804 can include a network-based smart cloud storage system to manage, store, and maintain content items and related data across numerous user accounts. In some embodiments, the multimodal content response generation system 100 and/or the content management system 804 utilize database 810 to store and access information such as content items or cached thumbnail images.

As also shown in FIG. 8, content management system 804 can also host multimodal large language model 806 and large language model 808. For example, the multimodal content response generation system 100 utilizes multimodal large language model 806 to process prompt data structures and generate synthesized responses to user output and thumbnail summaries and utilizes large language model 808 to generate synthesized summaries from thumbnail summaries. Though FIG. 8 illustrates multimodal large language model 806 and large language model 808 as part of multimodal content response generation system 100, multimodal large language model 806 and/or large language model 808 can be located on another system, such as third-party server 816 or client device 812.

Although FIG. 8 depicts the multimodal content response generation system located on the server(s) 802, in some implementations, the multimodal content response generation system 100 may be implemented by (e.g., located entirely or in part on) one or more other components of the environment. For example, the multimodal content response generation system may be implemented as part of client device 812 and/or a third-party system. As another example, the client device 812 and/or a third-party system can download all or part of the multimodal content response generation system 100 for implementation independent of, or together with, the server(s) 802.

In some implementations, though not illustrated in FIG. 8, environment 800 may have a different arrangement of components and/or may have a different number or set of components altogether. For example, the client device 812 may communicate directly with the multimodal content response generation system, bypassing network 820. The environment 800 may also include one or more third-party systems, each corresponding to a different data source. In addition, the environment 800 can include the database 810 located external to the server(s) 802 (e.g., in communication via the network 820) or located on the server(s) 802 and/or on the client device 812.

FIGS. 1-8, the corresponding text, and the examples provide a number of different methods, systems, devices, and non-transitory computer-readable media of the multimodal content response generation system. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for utilizing a multimodal large language model to generate responses for multimodal content items in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 902 of receiving a request to generate a synthesized response corresponding to a multimodal content item, an act 904 of generating one or more thumbnail images from the multimodal content item, an act 906 of generating a prompt data structure based on the one or more thumbnail images, an act 908 of generating the synthesized response by providing the prompt data structure within a prompt to a multimodal large language model, and an act 910 of providing the synthesized response for display on the client device.

Specifically, in one or more embodiments, the act 902 includes receiving, from a client device, a request to generate a synthesized response corresponding to a multimodal content item, the act 904 includes generating, in response to the request, one or more thumbnail images from the multimodal content item, the act 906 includes generating a prompt data structure based on the one or more thumbnail images, the act 908 includes generating, utilizing a multimodal large language model, the synthesized response by providing the prompt data structure within a prompt to the multimodal large language model, and the act 910 includes providing the synthesized response for display on the client device.

In one or more embodiments, the series of acts 900 include an act of generating the prompt data structure based on the one or more thumbnail images further comprises selecting a set of thumbnail images from the one or more thumbnail images to include within the prompt.

Further, in some embodiments, the series of acts 900 include an act of receiving, within a content management interface, a selection of an option to generate a synthesized response corresponding to a content item and based on analyzing internal content of the content item, determining that the content item satisfies a multimodal content classification.

In addition, in one or more embodiments, the series of acts 900 includes an act of generating one or more thumbnail images from the multimodal content item in response to determining that internal content of the content item satisfies the multimodal content classification.

Also, in one or more embodiments, the series of acts 900 include an act of utilizing a communication proxy to access internal content of the multimodal content item, determining a content type for the multimodal content item based on the internal content of the multimodal content item, and generating the one or more thumbnail images based on the content type for the multimodal content item.

Moreover, in some embodiments, the series of acts 900 includes an act of providing, within the prompt, a user input corresponding to the request to generate the synthesized response and instructions to generate the synthesized response based on the prompt data structure and the user input.

Additionally, in one or more embodiments, the series of acts 900 include an act of receiving, from the client device, a user input corresponding to the synthesized response, generating, utilizing the multimodal large language model, an additional synthesized response, and providing the additional synthesized response for display on the client device.

Further, in some embodiments, the series of acts 900 includes an act of determining that the request to generate the synthesized response requests an answer to a user input corresponding to the multimodal content item and generating the prompt data structure based determining that the request to generate the synthesized response requests the answer to the user input.

In some instances, the series of acts includes receiving, from a client device, a request to generate a synthesized response comprising an answer to a user input corresponding to a multimodal content item, generating, in response to the request, one or more thumbnail images from the multimodal content item, generating a prompt data structure by selecting of a set of thumbnail images from the one or more thumbnail images based on one or more embeddings generated from the one or more thumbnail images, generating, utilizing a multimodal large language model, the synthesized response by providing the set of thumbnail images within a prompt to the multimodal large language model, and providing the synthesized response for display on the client device.

In addition, in one or more embodiments, the series of acts 900 include an act of selecting the set of thumbnail images from the one or more thumbnail images based on the one or more embeddings generated from the one or more thumbnail images by generating, using a multimodal embedding-generating machine-learning model, the one or more embeddings from the one or more thumbnail images and selecting the set of thumbnail images for the prompt data structure based on the one or more embeddings.

Moreover, in some embodiments, the series of acts 900 include an act of selecting the set of thumbnail images from the one or more thumbnail images by ranking the one or more thumbnail images based on the one or more embeddings corresponding to the one or more thumbnail images and selecting the set of thumbnail images for within the prompt based on ranking the one or more thumbnail images.

Further, in one or more embodiments, the series of acts 900 include an act of generating the one or more embeddings corresponding to the one or more thumbnail images by generating, utilizing a multimodal embedding-generating machine-learning model, one or more image embeddings corresponding to the one or more thumbnail images and one or more text embeddings corresponding to the user input, and generating, utilizing the multimodal embedding-generating machine-learning model, embedding distances between the one or more image embeddings and the one or more text embeddings.

Moreover, in some embodiments, the series of acts 900 include an act of providing, within the prompt, instructions to generate the synthesized response based on the set of thumbnail images of the prompt data structure and according to the user input.

Also, in one or more embodiments, the series of acts 900 include an act of generate the one or more thumbnail images by accessing stored thumbnail images for the multimodal content item.

In one or more embodiments, the series of acts 900 includes receiving, from a client device, a request to generate a synthesized summary corresponding to a multimodal content item, generating, in response to the request, one or more thumbnail images from the multimodal content item, generating, utilizing a multimodal large language model, one or more thumbnail summaries from a prompt data structure comprised of thumbnail images of the one or more thumbnail images, generating, utilizing an additional large language model, the synthesized summary by providing the one or more thumbnail summaries within a prompt to the additional large language model, and providing the synthesized summary for display on the client device.

In some embodiments, the series of acts 900 include an act of generating the one or more thumbnail summaries by utilizing the multimodal large language model to generate one or more textual thumbnail summaries from the prompt data structure and providing the one or more textual thumbnail summaries to the additional large language model to generate the synthesized summary.

Additionally, in one or more embodiments, the series of acts 900 include an act of generating the prompt data structure comprised of one or more thumbnail images by selecting one or more sliding windows, each sliding window comprising two or more thumbnail images from the one or more thumbnail images.

Further, in some embodiments, the series of acts 900 include an act of selecting the one or more sliding windows comprising two or more thumbnail images by selecting two or more adjacent thumbnail images corresponding to adjacent content of the multimodal content item.

Moreover, in one or more embodiments, the series of acts 900 include an act of generating the one or more thumbnail summaries from the prompt data structure by providing a first set of thumbnail images corresponding to a first sliding window within a first prompt to generate a first thumbnail summary and providing a second set of thumbnail images corresponding to a second sliding window to generate a second thumbnail summary.

Also, in some embodiments, the series of acts 900 include receiving the request to generate the synthesized summary by receiving a user input of an option to generate a summary for a set of content items and determining that at least one content item within the set of content items satisfies a multimodal content classification.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission medium can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term “cloud computing” refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service (“SaaS”), Platform as a Service (“PaaS”), and Infrastructure as a Service (“IaaS”). A cloud-computing model can also be deployed using different deployment models such as private cloud, community cloud, public cloud, hybrid cloud, and so forth. In addition, as used herein, the term “cloud-computing environment” refers to an environment in which cloud computing is employed.

Figure 10:
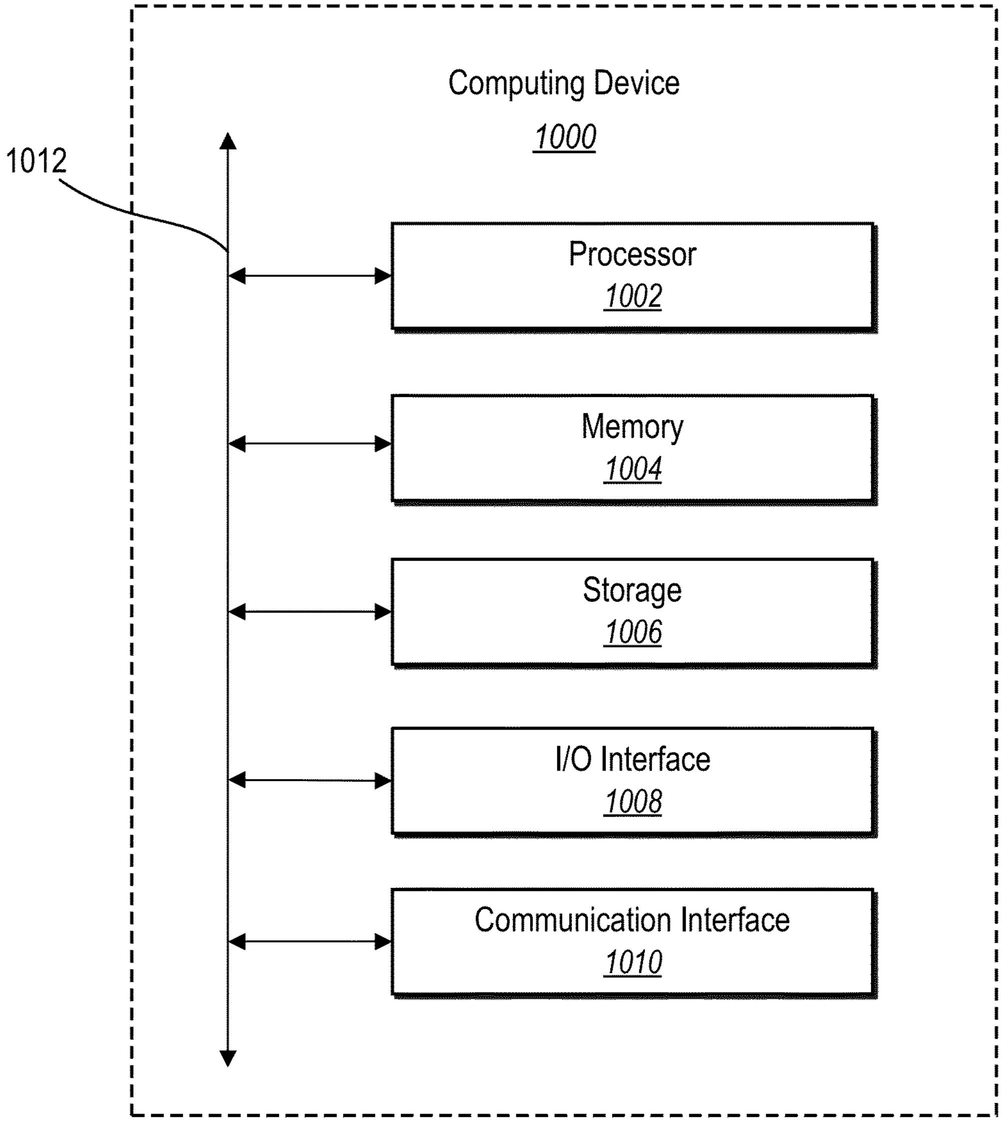
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., server(s) 802, client device 812, and third-party server 816). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or “I/O interfaces 1008”), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory (“RAM”), Read-Only Memory (“ROM”), a solid-state disk (“SSD”), Flash, Phase Change Memory (“PCM”), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

Figure 11:
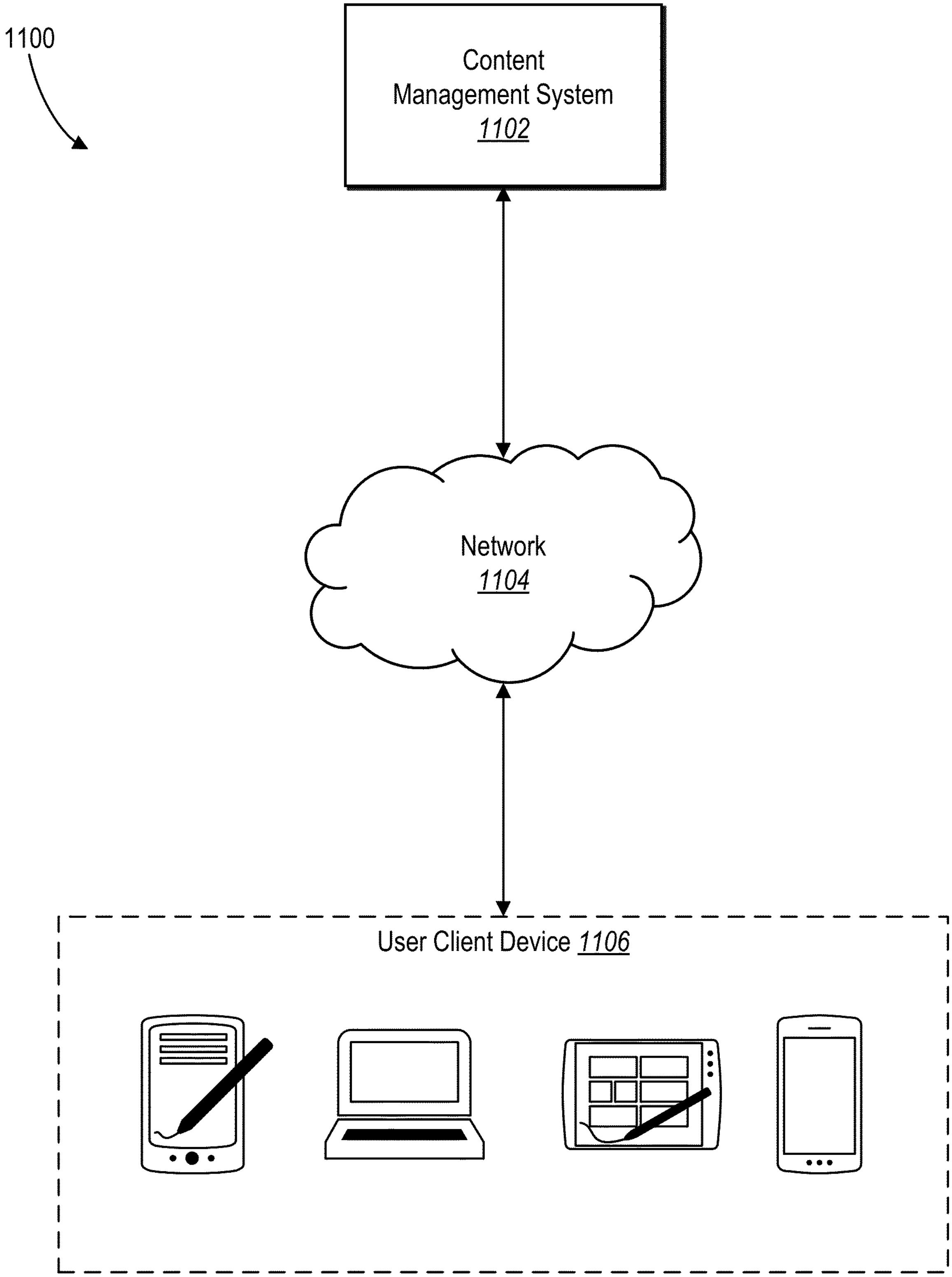
FIG. 11 illustrates an example network environment of a content management system in accordance with one or more embodiments.

FIG. 11 is a schematic diagram illustrating environment 1100 within which one or more implementations of the multimodal content response generation system 100 can be implemented. For example, the multimodal content response generation system 100 may be part of a content management system 1102 (e.g., the content management system 804). Content management system 1102 may generate, store, manage, receive, and send digital content (such as digital content items). For example, content management system 1102 may send and receive digital content to and from client devices 1106 by way of network 1104. In particular, content management system 1102 can store and manage a collection of digital content. Content management system 1102 can manage the sharing of digital content between computing devices associated with a plurality of users. For instance, content management system 1102 can facilitate a user sharing a digital content with another user of content management system 1102.

In particular, content management system 1102 can manage synchronizing digital content across multiple client devices 1106 associated with one or more users. For example, a user may edit digital content using client device 1106. The content management system 1102 can cause client device 1106 to send the edited digital content to content management system 1102. Content management system 1102 then synchronizes the edited digital content on one or more additional computing devices.

In addition to synchronizing digital content across multiple devices, one or more implementations of content management system 1102 can provide an efficient storage option for users that have large collections of digital content. For example, content management system 1102 can store a collection of digital content on content management system 1102, while the client device 1106 only stores reduced-sized versions of the digital content. A user can navigate and browse the reduced-sized versions (e.g., a thumbnail of a digital image) of the digital content on client device 1106. In particular, one way in which a user can experience digital content is to browse the reduced-sized versions of the digital content on client device 1106.

Another way in which a user can experience digital content is to select a reduced-size version of digital content to request the full- or high-resolution version of digital content from content management system 1102. In particular, upon a user selecting a reduced-sized version of digital content, client device 1106 sends a request to content management system 1102 requesting the digital content associated with the reduced-sized version of the digital content. Content management system 1102 can respond to the request by sending the digital content to client device 1106. Client device 1106, upon receiving the digital content, can then present the digital content to the user. In this way, a user can have access to large collections of digital content while minimizing the amount of resources used on client device 1106.

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access content management system 1102.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, a request to generate a synthesized response corresponding to a multimodal content item;

generating, in response to receiving the request and from the multimodal content item, one or more thumbnail images representing content of the multimodal content item;

selecting a preprocessing pipeline corresponding to a synthesized response type for the request to generate the synthesized response by selecting an answer preprocessing pipeline or a summary preprocessing pipeline;

generating a prompt data structure corresponding to the synthesized response type by:

selecting, utilizing the summary preprocessing pipeline, one or more sets of thumbnail images from the one or more thumbnail images by selecting one or more sliding windows, each sliding window comprising two or more thumbnail images; or selecting, in response to utilizing a multimodal embedding-generating machine-learning model of the answer preprocessing pipeline to generate embedding distances between image embeddings corresponding to the one or more thumbnail images and one or more text embeddings corresponding to a user input of the request to generate the synthesized response, a set of thumbnail images based on the embedding distances;

generating, utilizing a multimodal large language model, the synthesized response by providing the prompt data structure within a prompt to the multimodal large language model; and sending the synthesized response for display on the client device.

2. The computer-implemented method of claim 1, wherein selecting the preprocessing pipeline corresponding to the synthesized response type for the request further comprises analyzing the request to generate the synthesized response to determine if the user input of the request to generate the synthesized response corresponds to a request for a synthesized summary of the multimodal content item or a request to generate a synthesized response to the user input corresponding to the multimodal content item.

3. The computer-implemented method of claim 1, wherein receiving the request to generate the synthesized response corresponding to a multimodal content item further comprises:
- receiving, within a content management interface, a selection of an option to generate a synthesized response corresponding to a content item; and
- based on analyzing internal content of the content item, determining that the content item satisfies a multimodal content classification.

4. The computer-implemented method of claim 3, further comprising generating the one or more thumbnail images representing content of the multimodal content item in response to determining that internal content of the content item satisfies the multimodal content classification.

5. The computer-implemented method of claim 1, wherein generating the one or more thumbnail images representing content of the multimodal content item further comprises:
- utilizing a communication proxy to access internal content of the multimodal content item;
- determining a content type for the multimodal content item based on the internal content of the multimodal content item; and
- generating the one or more thumbnail images based on the content type for the multimodal content item.

6. The computer-implemented method of claim 1, further comprising providing, within the prompt, the user input of the request to generate the synthesized response and instructions to generate the synthesized response based on the prompt data structure and the user input.

7. The computer-implemented method of claim 1, further comprising:
- receiving, from the client device, an additional user input corresponding to the synthesized response;
- generating, utilizing the multimodal large language model, an additional synthesized response; and
- sending the additional synthesized response for display on the client device.

8. The computer-implemented method of claim 1, further comprising:
- determining that the synthesized response type corresponds to a request for an answer to a user input corresponding to the multimodal content item; and
- generating based on determining that the synthesized response type corresponds to the request for the answer to the user input, the prompt data structure by selecting the set of thumbnail images based on the embedding distances.

9. A non-transitory computer-readable medium storing instructions that, when executed by at least one processor, cause a computer system to:
- receive, from a client device, a request to generate a synthesized response comprising a request for an answer to a user input corresponding to a multimodal content item;
- generate, in response to the request, one or more thumbnail images representing content of the multimodal content item;
- based on determining that an answer preprocessing pipeline corresponds to the request to generate the synthesized response comprising the request for the answer to the user input, generate, utilizing a multimodal embedding-generating machine-learning model of the answer preprocessing pipeline, one or more image embeddings corresponding to the one or more thumbnail images and one or more text embeddings corresponding to the user input corresponding to the multimodal content item;
- generate a prompt data structure corresponding to the request to generate the synthesized response comprising the request for the answer to the user input by selecting of a set of thumbnail images from the one or more thumbnail images based on embedding distances between the one or more image embeddings corresponding to the one or more thumbnail images and the one or more text embeddings corresponding to the user input;
- generate, utilizing a multimodal large language model, the synthesized response by providing the set of thumbnail images and instructions to generate the synthesized response using the set of thumbnail images within a prompt to the multimodal large language model; and
- send the synthesized response to the client device.

10. The non-transitory computer-readable medium of claim 9, further comprising instructions that, when executed by the at least one processor, cause the computer system to generate the one or more thumbnail images representing content of the multimodal content item by:
- utilizing a communication proxy to access internal content of the multimodal content item;
- determining a content type for the multimodal content item based on the internal content of the multimodal content item; and
- generating the one or more thumbnail images based on the content type for the multimodal content item.

11. The non-transitory computer-readable medium of claim 10, further comprising instructions that, when executed by the at least one processor, cause the computer system to select the set of thumbnail images from the one or more thumbnail images by:
- ranking the one or more thumbnail images based on the embedding distances between the one or more image embeddings corresponding to the one or more thumbnail images and the one or more text embeddings corresponding to the user input; and
- selecting the set of thumbnail images for within the prompt data structure based on ranking the one or more thumbnail images.

12. The non-transitory computer-readable medium of claim 9, further comprising instructions that, when executed by the at least one processor, cause the computer system to receive the request to generate the synthesized response corresponding to a multimodal content item by:
- in response to receiving the request to generate the synthesized response comprising the request for the answer to the user input corresponding to a content item, analyzing internal content of the content item; and
- based on analyzing internal content of the content item, determining that the content item satisfies a multimodal content classification.

13. The non-transitory computer-readable medium of claim 9, further comprising instructions that, when executed by the at least one processor, cause the computer system to provide, within the prompt, instructions to generate the synthesized response based on the set of thumbnail images of the prompt data structure and according to the user input.

14. The non-transitory computer-readable medium of claim 9, further comprising instructions that, when executed by the at least one processor, cause the computer system to generate the one or more thumbnail images by accessing stored thumbnail images for the multimodal content item.

15. A system comprising:

at least one processor; and at least one non-transitory computer-readable storage medium storing instructions that, when executed by the at least one processor, cause the system to:

receive, from a client device, a request to generate a synthesized summary corresponding to a multimodal content item;

generate, in response to the request, one or more thumbnail images representing content of the multimodal content item;

determine that a summary preprocessing pipeline corresponds to the request to generate the synthesized summary;

generate, utilizing the summary preprocessing pipeline, a prompt data structure corresponding to the request to generate the synthesized summary by selecting one or more sets of thumbnail images from the one or more thumbnail images;

generate, utilizing a multimodal large language model, one or more thumbnail summaries for the one or more sets of thumbnail images of the prompt data structure;

generate, utilizing an additional large language model, the synthesized summary by providing the one or more thumbnail summaries within a prompt to the additional large language model; and send the synthesized summary for display on the client device.

16. The system of claim 15, further comprising instructions that, when executed by the at least one processor, cause the system to generate the synthesized summary by:

generating the one or more thumbnail summaries by utilizing the multimodal large language model to generate one or more textual thumbnail summaries from the one or more sets of thumbnail images of the prompt data structure; and providing the one or more textual thumbnail summaries to the additional large language model to generate the synthesized summary.

17. The system of claim 15, further comprising instructions that, when executed by the at least one processor, cause the system to select the one or more sets of thumbnail images by selecting one or more sliding windows, each sliding window comprising two or more thumbnail images from the one or more thumbnail images.

18. The system of claim 17, further comprising instructions that, when executed by the at least one processor, cause the system to select the one or more sliding windows comprising two or more thumbnail images by selecting two or more adjacent thumbnail images corresponding to adjacent content of the multimodal content item.

19. The system of claim 15, further comprising instructions that, when executed by the at least one processor, cause the system to generate the one or more thumbnail summaries for the one or more sets of thumbnail images of the prompt data structure by:

providing a first set of thumbnail images corresponding to a first sliding window to generate a first thumbnail summary; and providing a second set of thumbnail images corresponding to a second sliding window to generate a second thumbnail summary.

20. The system of claim 15, further comprising instructions that, when executed by the at least one processor, cause the system to:

receive the request to generate the synthesized summary by receiving a user selection of an option to generate a summary for a set of content items; and determining that at least one content item within the set of content items satisfies a multimodal content classification.

* * * * *